United States Patent
Shin et al.

(10) Patent No.: US 12,308,016 B2
(45) Date of Patent: May 20, 2025

(54) ELECTRONIC DEVICE INCLUDING SPEAKER AND MICROPHONE AND METHOD FOR OPERATING THE SAME

(71) Applicant: Samsung Electronics Co., Ltd., Gyeonggi-do (KR)

(72) Inventors: Hoseon Shin, Gyeonggi-do (KR); Chulmin Lee, Gyeonggi-do (KR); Taegu Kim, Gyeonggi-do (KR); Kyounggu Woo, Gyeonggi-do (KR); Youngwoo Lee, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 522 days.

(21) Appl. No.: 17/666,900

(22) Filed: Feb. 8, 2022

(65) Prior Publication Data

US 2022/0261218 A1    Aug. 18, 2022

Related U.S. Application Data

(63) Continuation of application No. PCT/KR2022/001151, filed on Jan. 21, 2022.

(30) Foreign Application Priority Data

Feb. 18, 2021 (KR) .................. 10-2021-0021842

(51) Int. Cl.
*G10L 15/08* (2006.01)

(52) U.S. Cl.
CPC ........ *G10L 15/08* (2013.01); *G10L 2015/088* (2013.01)

(58) Field of Classification Search
CPC ... G10L 15/08; G10L 2015/088; G10L 17/00; G10L 17/04; G06F 3/165; G06F 3/167
See application file for complete search history.

(56) References Cited

U.S. PATENT DOCUMENTS 10,681,453 B1 *  6/2020  Meiyappan ............... H04R 1/08
11,412,133 B1 *  8/2022  Morton ................ G05D 1/0246
(Continued)

FOREIGN PATENT DOCUMENTS

CN      103414982 A    11/2013
JP      2005-192004 A   7/2005
(Continued)

OTHER PUBLICATIONS

International Search Report dated Apr. 26, 2022.

*Primary Examiner* — Fariba Sirjani
(74) *Attorney, Agent, or Firm* — Cha & Reiter, LLC

(57) ABSTRACT

According to various embodiments, an electronic device is provided. The electronic device includes a communication circuit, a plurality of microphones, a speaker, and at least one processor. The at least one processor is configured to output audio through the speaker based on data received from an external electronic device through the communication circuit, identify an utterance including a specified keyword received through at least some of the plurality of microphones, based on identifying the utterance including the specified keyword, decrease the volume of the audio output through the speaker and perform an operation for providing a speech of a user of the electronic device and a speech of a person other than the user of the electronic device based on at least some of ambient sounds received through at least some of the plurality of microphones.

19 Claims, 28 Drawing Sheets

(56) References Cited

U.S. PATENT DOCUMENTS

| | | | |
|---|---|---|---|
| 12,020,704 B2* | 6/2024 | Nguyen | G10L 15/08 |
| 2002/0141599 A1* | 10/2002 | Trajkovic | G10K 11/17873 |
| | | | 381/72 |
| 2016/0173049 A1 | 6/2016 | Mehta | |
| 2017/0071822 A1 | 3/2017 | Tran et al. | |
| 2017/0193978 A1 | 7/2017 | Goldman | |
| 2017/0195787 A1 | 7/2017 | Ichimura | |
| 2017/0215011 A1* | 7/2017 | Goldstein | H04R 25/305 |
| 2019/0124436 A1* | 4/2019 | Usher | G10L 15/00 |
| 2019/0228778 A1* | 7/2019 | Lesso | G10L 17/04 |
| 2019/0341057 A1* | 11/2019 | Zhang | G10L 25/78 |
| 2021/0014610 A1 | 1/2021 | Carrigan et al. | |
| 2021/0043191 A1* | 2/2021 | Chao | G10L 17/24 |
| 2021/0099787 A1* | 4/2021 | Yang | G10K 11/17873 |
| 2021/0168516 A1* | 6/2021 | Wexler | G10L 15/26 |
| 2021/0183358 A1* | 6/2021 | Mao | G10L 17/04 |
| 2021/0407532 A1 | 12/2021 | Salahuddin et al. | |
| 2022/0014839 A1* | 1/2022 | Tartz | G10K 11/17837 |
| 2022/0139388 A1* | 5/2022 | Sharifi | H04M 3/40 |
| | | | 704/231 |
| 2022/0261218 A1* | 8/2022 | Shin | G10L 15/08 |

FOREIGN PATENT DOCUMENTS

| | | | |
|---|---|---|---|
| JP | 2009-300915 A | 12/2009 | |
| JP | 2016-51915 A | 4/2016 | |
| KR | 10-2003-0009504 A | 1/2003 | |
| KR | 10-1634133 B1 | 6/2016 | |
| KR | 10-2020-0113058 A | 10/2020 | |
| KR | 10-2020-0145219 A | 12/2020 | |

* cited by examiner

ELECTRONIC DEVICE INCLUDING SPEAKER AND MICROPHONE AND METHOD FOR OPERATING THE SAME

CROSS-REFERENCE TO RELATED APPLICATIONS

This application is a continuation of International Application No. PCT/KR2022/001151 designating the United States, filed on Jan. 21, 2022, in the Korean Intellectual Property Receiving Office and claiming priority to Korean Patent Application No. 10-2021-0021842, filed on Feb. 18, 2021, in the Korean Intellectual Property Office, the disclosures of which are incorporated by reference herein in their entireties.

FIELD

The disclosure relates to an electronic device, for example, an electronic device including a speaker and a microphone and a method of operating the same.

BACKGROUND

These days, portable digital communication devices have become a necessity for many people. Consumers want to receive a variety of high-quality services anytime, anywhere through their portable digital communication devices.

Among the portable digital communication devices, there is an audio output device such as an earphone that has a physical structure worn on the ears of a consumer and executes a function of providing audio such as music.

The audio output device may wiredly receive audio data from a consumer's terminal and provide audio. Recently, demands for wireless audio output devices capable of providing audio by establishing a wireless communication connection with a terminal have been increasing. In this context, there is a need for implementing a technology of improving the use convenience of an audio output device, which is increasingly demanded.

The above information is presented as background information only to assist with an understanding of the disclosure. No determination has been made, and no assertion is made, as to whether any of the above might be applicable as prior art with regard to the disclosure.

Audio output devices are provided in pairs, and each of the audio output devices may output audio through a speaker using audio data received from user equipment (UE) (i.e. the portable digital communication device). Further, each of the audio output devices obtains ambient (or background) noise received through a microphone and outputs anti-noise to cancel the ambient (or background) noise through the speaker. Therefore, the user may only listen to the audio provided by the pair of audio output devices, without hearing utterances of other speakers around the user. For example, while listening to audio through the audio output devices, the user may not hear another speaker calling the user for conversation. Accordingly, the use convenience of the audio output devices may be remarkably decreased for the user. According to various embodiments, an electronic device and a method of operating the same may enable a user to hear a speech of another person, while wearing an electronic device (e.g., audio output devices), by controlling audio output (e.g., media output based on audio data, anti-noise output, and ambient sound output) through a speaker, when a speech (or utterance) including a specified keyword is received through a microphone. Therefore, the use convenience of the electronic device may be increased. Further, according to various embodiments, the electronic device and the method of operating the same may obtain and provide a speech of a user of the electronic device and a speech of a speaker selected by the user, using a feature model generated based on speaker embeddings for the user and the selected speaker. Accordingly, the user may concentrate more on conversation with others, while wearing the electronic device (e.g., audio output devices).

SUMMARY

According to various embodiments, there is provided an electronic device. The electronic device includes a communication circuit, a plurality of microphones, a speaker, and at least one processor. The at least one processor is configured to output audio through the speaker based on data received from an external electronic device through the communication circuit, based on the identification of the utterance including the specified keyword, identify an utterance including a specified keyword received through at least some of the plurality of microphones, and decrease the volume of the audio output through the speaker and perform an operation for providing a speech of a user of the electronic device and a speech of a person other than the user of the electronic device based on at least some of ambient sounds received through at least some of the plurality of microphones.

According to various embodiments, there is provided a method of operating an electronic device. The method includes outputting audio through a speaker based on data received from an external electronic device through a communication circuit of the electronic device, identifying an utterance including a specified keyword received through at least some of a plurality of microphones of the electronic device, and based on the identification of the utterance including the specified keyword, decreasing the volume of the audio output through the speaker and performing an operation for providing a speech of a user of the electronic device and a speech of a person other than the user of the electronic device based on at least some of ambient sounds received through at least some of the plurality of microphones.

According to various embodiments, there is provided an electronic device. The electronic device includes a communication circuit, a plurality of microphones, a speaker, and at least one processor. The at least one processor is configured to output audio through the speaker based on data received through the communication circuit, decrease the volume of the audio output through the speaker, when a first utterance of a user of the electronic device has been received through at least some of the plurality of microphones for a specified first time, and decrease the volume of the audio output through the speaker based on reception of a third utterance of the user for a second time shorter than the first time after the reception of the second utterance, when a second utterance including a specified keyword is received through at least some of the plurality of microphones.

According to various embodiments, an electronic device and a method of operating the same may be provided, and they may increase the use convenience of the electronic device by, upon receipt of speech (or utterance) including a specified keyword, controlling output of audio (for example, media output based on audio data, anti-noise output, and ambient sound output) through a speaker and thus enabling the user to listen to the speech of another person, while wearing the electronic device (for example, an audio output device).

Further, according to various embodiments, an electronic device and a method of operating the same may be provided, and they may enable the user of the electronic device to concentrate on a conversation with another person, while wearing the electronic device (for example, an audio output device) by obtaining and providing speeches of the user and a selected speaker by using a speech model generated based on speaker embeddings for the user and the selected speaker.

BRIEF DESCRIPTION OF THE DRAWINGS

The above and other aspects, features and advantages of various embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
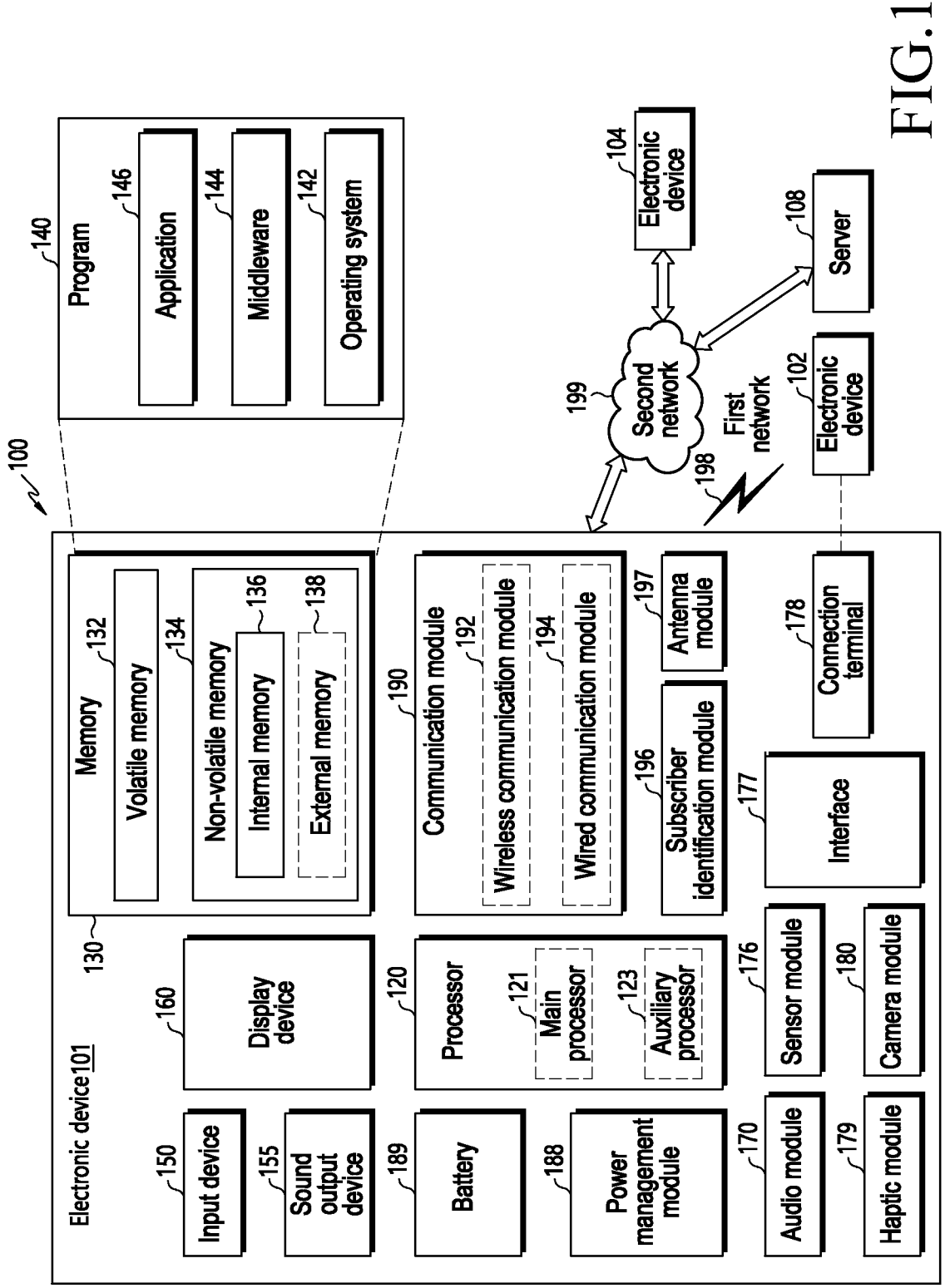
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
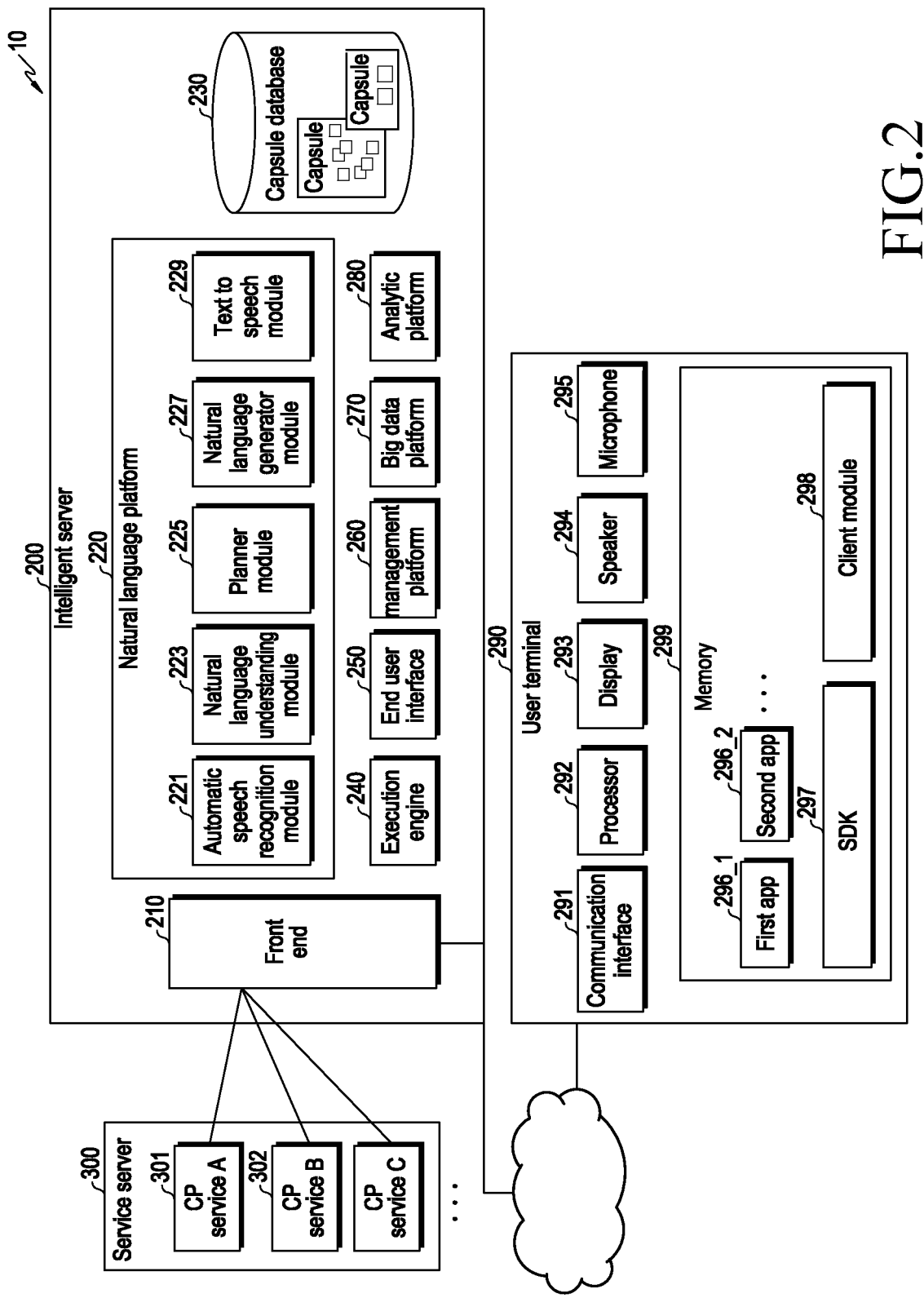
FIG. 2 is a block diagram illustrating an integrated intelligence system according to an embodiment.

FIG. 2 is a block diagram illustrating an integrated intelligence system according to an embodiment.

Referring to FIG. 2, an integrated intelligence system 10 according to an embodiment may include a user equipment (UE) 290, an intelligent server 200, and a service server 300.

The UE 290 according to an embodiment may be a terminal device (or electronic device) connectable to the Internet. For example, the UE 290 may be a portable phone, a smart phone, a personal digital assistant (PDA), a laptop computer, a TV, a household appliance, an electronic device, a head-mounted display (HMD), or a smart speaker.

According to the illustrated embodiment, the UE 290 may include a communication interface 291, a microphone 295, a speaker 294, a display 293, a memory 299, and/or a processor 292. These components may be operatively or electrically coupled to one another.

The communication interface 291 according to an embodiment may be connected to an external device and configured to transmit and receive data to and from the external device. The microphone 295 according to an embodiment may receive a sound (for example, a user utterance) and convert the sound to an electrical signal. The speaker 294 according to an embodiment may output an electrical signal as sound (for example, speech). The display 293 according to an embodiment may be configured to display image or video. The display 293 according to an embodiment may display a graphical user interface (GUI) of an executed app (or application program).

The memory 299 according to an embodiment may store a client module 298, a software development kit (SDK) 297, and a plurality of apps 296. The client module 298 and the SDK 297 may form a framework (or a solution program) to execute general-purpose functions. Further, the client module 298 or the SDK 297 may form a framework to process speech input.

The plurality of apps 296 may be programs for executing specified functions. According to an embodiment, the plurality of apps 296 may include a first app 296_1 and a second app 296_2. According to an embodiment, each of the plurality of apps 296 may include a plurality of operations for executing the specified functions. For example, the apps may include an alarm app, a message app, and/or a scheduling app. According to an embodiment, the plurality of apps 296 may be executed by the processor 292 to sequentially execute at least one of the plurality of operations.

The processor 292 according to an embodiment may provide overall control to the UE 290. For example, the processor 292 may be electrically coupled to the communication interface 291, the microphone 295, the speaker 294, and the display 293 and perform specified operations.

The processor 292 according to an embodiment may also execute a program stored in the memory 299 to execute specified functions. For example, the processor 292 may execute at least one of the client module 298 or the SDK 297 to perform the following operation for processing speech input. The processor 292 may control the operations of the plurality of apps 296, for example, through the SDK 297. The following operations described as performed by the client module 298 or the SDK 297 may be performed by the processor 292.

The client module 298 according to an embodiment may receive a speech input. For example, the client module 298 may receive a speech signal corresponding to a user utterance detected through the microphone 295. The client module 298 may transmit the received speech input to the intelligent server 200. The client module 298 may transmit state information about the UE 290 together with the received speech input to the intelligent server 200. The state information may be, for example, information about the execution state of an app.

The client module 298 according to an embodiment may receive a result corresponding to the received speech input. For example, when the intelligent server 200 is capable of calculating the result corresponding to the received speech input, the client module 298 may receive the result corresponding to the received speech input. The client module 298 may display the received result on the display 293.

The client module 298 according to an embodiment may receive a plan corresponding to the received speech input. The client module 298 may display results of executing a plurality of operations of the app on the display 293 according to the plan. For example, the client module 298 may sequentially display the execution results of the plurality of operations on the display 293. In another example, the UE 290 may display only some of the execution results of the plurality of operations (for example, only the result of the last operation) on the display 293.

According to an embodiment, the client module 298 may receive, from the intelligent server 200, a request for obtaining information required to calculate the result corresponding to the speech input. According to an embodiment, the client module 298 may transmit the required information to the intelligent server 200 in response to the request.

The client module 298 according to an embodiment may transmit information about the results of performing the plurality of operations according to the plan to the intelligent server 200. The intelligent server 200 may identify that the received speech input has been correctly processed by using the result information.

The client module 298 according to an embodiment may include a speech recognition module. According to an embodiment, the client module 298 may recognize a speech input corresponding to the execution of a limited function using the speech recognition module. For example, the client module 298 may execute an intelligent app for processing a speech input for a specific operation such as waking up the UE 290.

The intelligent server 200 according to an embodiment may receive information related to a user speech input from the UE 290 through a communication network. According to an embodiment, the intelligent server 200 may convert data related to the received speech input into text data. According to an embodiment, the intelligent server 200 may generate a plan for performing a task corresponding to the user speech input based on the text data.

According to one embodiment, the plan may be generated by an artificial intelligent (AI) system. The AI system may be a rule-based system or a neural network-based system (for example, a feedforward neural network (FNN) or a recurrent neural network (RNN)). Alternatively, the AI system may be a combination of the above systems or any other AI system. According to an embodiment, the plan may be selected from a set of predefined plans or generated in real time in response to a user request. For example, the AI system may select at least one of a plurality of predefined plans.

The intelligent server 200 according to an embodiment may transmit the result based on the generated plan to the UE 290 or may transmit the generated plan to the UE 290. According to an embodiment, the UE 290 may display the result based on the plan on the display 293. According to an embodiment, the UE 290 may display the results from performing operations according to the plan on the display 693.

The intelligent server 200 according to an embodiment may include a front end 210, a natural language platform 220, a capsule database (DB) 230, an execution engine 240, an end user interface 250, a management platform 260, a big data platform 270, or an analytic platform 280.

The front end 210 according to an embodiment may receive a speech input from the UE 290. The front end 210 may transmit a response to the speech input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 according to an embodiment may convert a speech input received from the UE 290 into text data. The NLU module 223 according to an embodiment may understand the user's intention by using the text data of the speech input. For example, the NLU module 223 may understand the user's intention by performing syntactic analysis or semantic analysis. The NLU module 223 according to an embodiment may understand the meaning of word(s) extracted from the speech input by using linguistic features (for example, grammatical elements) of morphemes or phrases and match the understood meaning of the word to an intention, thereby determining the user's intention.

The planner module 225 according to an embodiment may generate a plan by using the intention determined by the NLU module 223 and parameters. According to an embodiment, the planner module 225 may determine a plurality of domains required to perform a task based on the determined intention. The planner module 225 may determine a plurality of operations included in each of the plurality of domains determined based on the intention. According to an embodiment, the planner module 225 may determine parameters required for performing the determined plurality of operations or result values output as a result of the execution of the plurality of operations. The parameters and the result values may be defined as concepts in specified formats (or classes). Accordingly, the plan may include the plurality of operations determined based on the user's intention and the plurality of concepts. The planner module 225 may determine a relationship between the plurality of operations and the plurality of concepts in a stepwise (or hierarchical) manner. For example, the planner module 225 may determine an execution order of the plurality of operations determined based on the user's intention according to the plurality of concepts. In other words, the planner module 225 may determine the execution order of the plurality of operations based on the parameters required for the execution of the plurality of operations and the results output as a result of the execution of the plurality of operations. Accordingly, the planner module 225 may generate a plan including information about association (for example, ontology) between the plurality of operations and the plurality of concepts. The planner module 225 may generate the plan by using information stored in the capsule DB 230 that stores information about sets of relationships between concepts and operations.

The NLG module 227 according to an embodiment may convert specified information into text. The information converted into the text may be in the form of a natural language speech. The TTS module 229 according to an embodiment may convert information in the form of text into information in the form of a speech.

According to an embodiment, some or all of the functions of the natural language platform 220 may be implemented in the UE 290 as well.

The capsule DB 230 may store information about association between the plurality of concepts and the plurality of operations corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry storing strategy information required for determining a plan corresponding to a speech input. In the presence of a plurality of plans corresponding to the speech input, the strategy information may include reference information for determining one plan. According to an embodiment, the capsule DB 230 may include a follow-up registry storing information about a follow-up operation to suggest the follow-up operation to the user in a specified situation. The follow-up operation may include, for example, a follow-up utterance. According to an embodiment, the capsule DB 230 may include a layout registry storing information about the layout of information output through the UE 290. According to an embodiment, the capsule DB 230 may include a vocabulary registry storing vocabulary information included in capsule information. According to an embodiment, the capsule DB 230 may include a dialog registry storing information about a dialog (or interaction) with the user. The capsule DB 230 may update the stored objects through a developer tool. The developer tool may include, for example, a function editor for updating action objects or concept objects. The developer tool may include a vocabulary editor for updating vocabularies. The developer tool may include a strategy editor for generating and registering a strategy for determining a plan. The developer tool may include a dialog editor that generates a dialog with the user. The developer tool may include a follow-up editor capable of activating a follow-up target and editing a follow-up speech that provides a hint. The follow-up target may be determined based on a currently set target, user preferences, or an environmental condition. In an embodiment, the capsule DB 230 may be implemented in the UE 290 as well.

The execution engine 240 according to an embodiment may calculate a result by using the generated plan. The end user interface 250 may transmit the calculated result to the UE 290. Accordingly, the UE 290 may receive the result and provide the received result to the user. The management platform 260 according to an embodiment may manage information used in the intelligent server 200. The big data platform 270 according to an embodiment may collect user data. The analytic platform 280 according to an embodiment may manage the quality of service (QoS) of the intelligent server 200. For example, the analytic platform 280 may manage components and processing speed (or efficiency) of the intelligent server 200.

The service server 300 according to an embodiment may provide a specified service (for example, food order or hotel reservation) to the UE 290. According to an embodiment, the service server 300 may be a server operated by a third party. The service server 300 according to an embodiment may provide information for generating a plan corresponding to a received speech input to the intelligent server 200. The provided information may be stored in the capsule DB 230. Further, the service server 300 may provide result information according to the plan to the intelligent server 200.

In the integrated intelligence system 10 described above, the UE 290 may provide various intelligent services to the user in response to a user input. The user input may include, for example, an input applied through a physical button, a touch input, or a speech input.

In an embodiment, the UE 290 may provide a speech recognition service through an intelligent app (or a speech recognition app) stored therein. In this case, for example, the UE 290 may recognize a user utterance or speech input received through the microphone, and provide a service corresponding to the recognized speech input to the user.

In an embodiment, the UE 290 may perform a specified operation alone or in conjunction with the intelligent server and/or the service server, based on the received speech input. For example, the UE 290 may execute an app corresponding to the received speech input and perform the specified operation through the executed app.

In an embodiment, when the UE 290 provides the service in conjunction with the intelligent server 200 and/or the service server, the UE 290 may detect a user utterance by using the microphone 295, and generate a signal (or speech data) corresponding to the detected user utterance. The UE may transmit the speech data to the intelligent server 200 through the communication interface 291.

The intelligent server 200 according to an embodiment may generate a plan for performing a task corresponding to a speech input and/or the result of performing an operation according to the plan, in response to the speech input received from the UE 290. The plan may include, for example, a plurality of operations for performing a task corresponding to the user speech input, and a plurality of concepts related to the plurality of operations. The concepts may define parameters input for execution of the plurality of operations or result values output as a result of the execution of the plurality of operations. The plan may include information about association between the plurality of operations and the plurality of concepts.

The UE 290 according to an embodiment may receive the response through the communication interface 291. The UE 290 may output a speech signal generated inside the UE 290 to the outside through the speaker 294, or may externally output an image generated inside the UE 290 by using the display 293.

Figure 3:
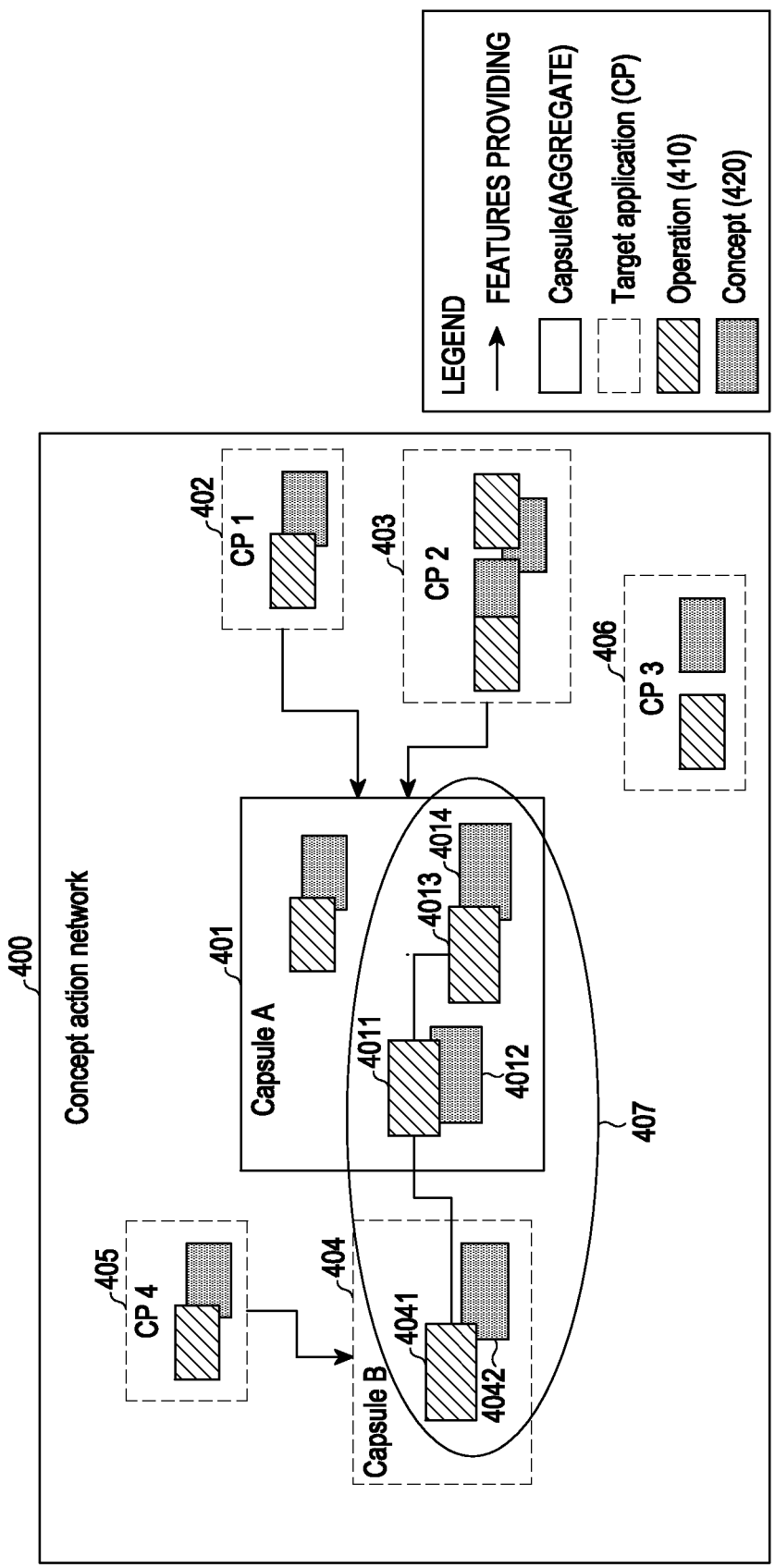
FIG. 3 is a diagram illustrating storage of information about association between concepts and operations in a DB according to various embodiments.

FIG. 3 is a diagram illustrating storage of information about association between concepts and operations in a DB according to various embodiments.

A capsule DB (for example, the capsule DB 230) of the intelligent server 200 may store capsules in the form of CAN. The capsule DB may store an operation for processing a task corresponding to a user speech input and a parameter required for the operation, in the form of the CAN.

The capsule DB may store a plurality of capsules (capsule A 401 and capsule B 404) corresponding to a plurality of domains (for example, applications), respectively. According to an embodiment, one capsule (for example, capsule A 401) may correspond to one domain (for example, a location (geo) application). In addition, at least one service provider (for example, CP 1 402 or CP 2 403) for executing a function for a domain related to a capsule may correspond to the capsule. According to an embodiment, one capsule may include at least one operation 410 and at least one concept 420 to execute a specified function.

The natural language platform 220 may generate a plan for performing a task corresponding to a received speech input by using a capsule stored in the capsule DB. For example, the planner module 225 of the natural language platform 220 may generate a plan by using a capsule stored in the capsule DB. For example, a plan 407 may be generated by using operations 4011 and 4013 and concepts 4012 and 4014 of capsule A 410 and an operation 4041 and a concept 4042 of capsule B 404.

Figure 4:
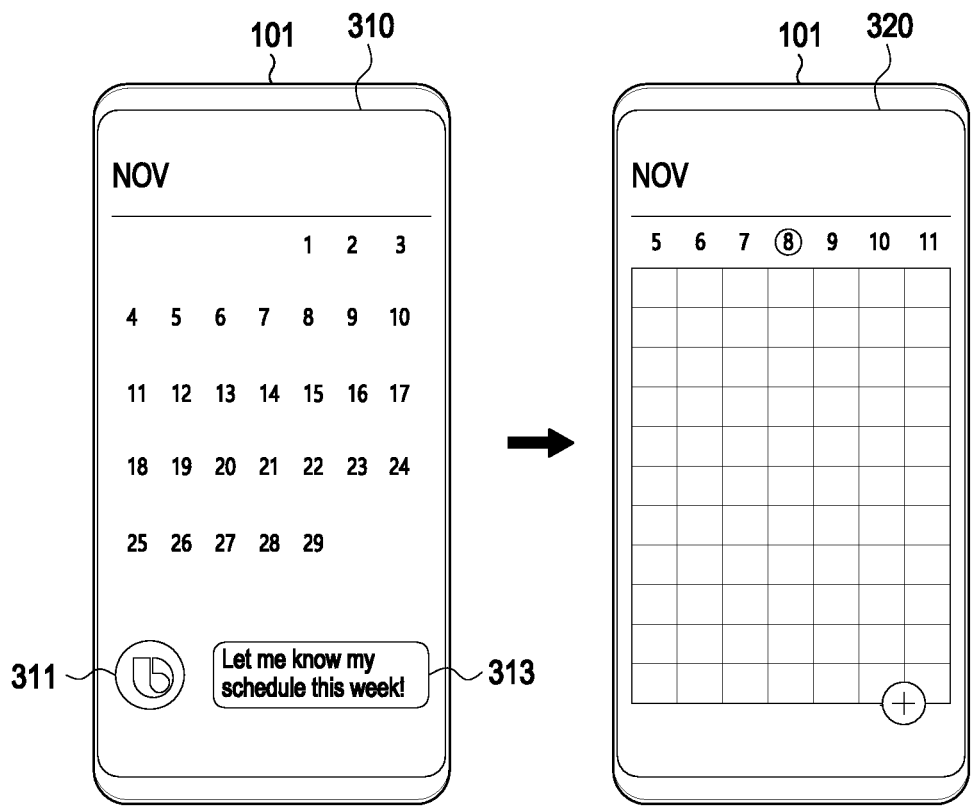
FIG. 4 is a diagram illustrating screens for processing a speech input received through an intelligent app at a UE according to various embodiments.

FIG. 4 is a diagram illustrating screens on which a UE processes a received speech input through an intelligent app according to various embodiments.

The UE 290 may execute an intelligent app to process a user input through the intelligent server 200.

According to an embodiment, when the UE 290 recognizes a specified speech input (for example, wake-up!) or receives an input through a hardware key (for example, a dedicated hardware key), the UE 290 may execute an intelligent app to process the speech input on a screen 310. The UE 290 may, for example, execute the intelligent app while running a scheduling app. According to an embodiment, the UE 290 may display an object (for example, an icon) 311 representing the intelligent app on the display 293. According to an embodiment, the UE 290 may receive a speech input from a user utterance. For example, the UE 290 may receive a speech input "Let me know my schedule this week!". According to an embodiment, the UE 290 may display a user interface (UI) 313 (for example, an input window) of the intelligent app, on which text data of the received speech input is displayed on the display 293.

According to an embodiment, on a screen 320, the UE 290 may display a result corresponding to the received speech input on the display. For example, the UE 290 may receive a plan corresponding to the received user input and display "this week schedule" on the display according to the plan.

An example of an electronic device 501, a UE 503, and an intelligent server 505 according to various embodiments will be described.

Figure 5:
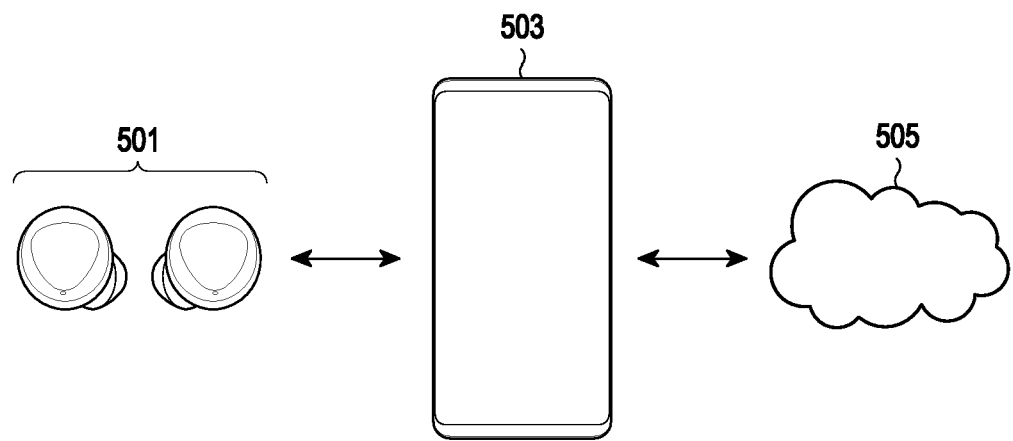
FIG. 5 is a diagram illustrating an example of a wearable device, an electronic device, and an intelligent server according to various embodiments.

FIG. 5 is a diagram illustrating an example of the electronic device 501, the UE 503, and the intelligent server 505 according to various embodiments. Each of the electronic device 501, the UE 503, and the intelligent server 505 will be described below with reference to FIG. 5.

According to various embodiments, the electronic device 501 may be a wearable electronic device which includes a housing of any of various types of physical structures (for example, a kernel type or an open type) wearable on a part (for example, ears) of the user's body and executes a function of providing audio (or sound) to the user. Components disposed inside or outside the housing of the electronic device 501 will be described later with reference to FIG. 6A. The electronic device 501 may configure (or establish) a communication connection with the UE 503, receive various types of data from the UE 503, or transmit various types of data to the UE 503. For example, the communication connection may be established in conformance to a communication scheme for establishing a direct communication connection, such as Bluetooth and wireless fidelity (Wi-Fi) direct. However, the disclosure is not limited thereto, and the communication connection may be established in conformance to a communication scheme (for example, Wi-Fi) using an access point (AP) or a communication connection scheme based on cellular communication using a BS (for example, 3rd generation (3G), 4th generation (4G)/long term evolution (LTE), and 5th generation (5G)). In an embodiment, the electronic device 501 may receive audio data from the UE 503 via the established communication connection and output audio through a speaker 621 based on the received audio data. In an embodiment, the electronic device 501 may receive ambient (or external) sounds through at least one microphone 620 and transmit information about the received sounds to the UE 503 via the communication connection. The electronic device 501 may be any of various types of devices wearable on the ears and/or provide audio, and is not limited to the description and/or the illustration. For example, the electronic device 501 may be wired earphones, wired/wireless headsets, neckband earphones, and/or an HMD.

According to various embodiments, the UE 503 may control the operations of the electronic device 501. For example, the UE 503 may transmit, to the electronic device 501, instructions causing processing of various types of data (for example, instructions causing reproduction of audio data) together with various types of data (for example, audio data) via the above-described communication connection established between the electronic device 501 and the UE 503, and control the electronic device 501 to perform a specified operation (for example, to output audio data). For example, the UE 503 may transmit audio data for audio to be played in the electronic device 501 based on execution and/or activation of various types of applications (for example, media playback applications such as a music play application and a video play application). In another example, the UE 503 may provide various intelligent services (for example, a speech recognition service) using the intelligent server 505 as described before with reference to FIGS. 2, 3 and 4. In an embodiment, when the UE 503 receives a user utterance or a speech input obtained by the electronic device 501 from the electronic device 501, the UE 503 may transmit the received user utterance or speech input to the intelligent server 505, so that the user utterance or speech input may be processed, and receive result information from the intelligent server 505. The UE 503 may autonomously provide a speech recognition service based on the received result information, or may transmit the result information to the electronic device 501 to provide the speech recognition service through the electronic device 501. The electronic device 501 and the intelligent server 505 may be directly connected to each other for communication, and such connection is not limited to the description and/or the illustration. Since the UE 503 may be implemented in the same manner as the electronic device 101 described before with reference to FIG. 1 and/or as the UE 290 described before with reference to FIGS. 2, 3 and 4, duplicative descriptions thereof are omitted.

According to various embodiments, the intelligent server 505 may be a server implemented to provide the speech recognition service. Since the intelligent server 505 may be implemented in the same manner as the intelligent server 200 described before with reference to FIGS. 2, 3 and 4, duplicative descriptions thereof are omitted.

A description will be given below of an exemplary configuration of each of the electronic device 501, the UE 503, and the intelligent server 505 according to various embodiments.

Figure 6A:
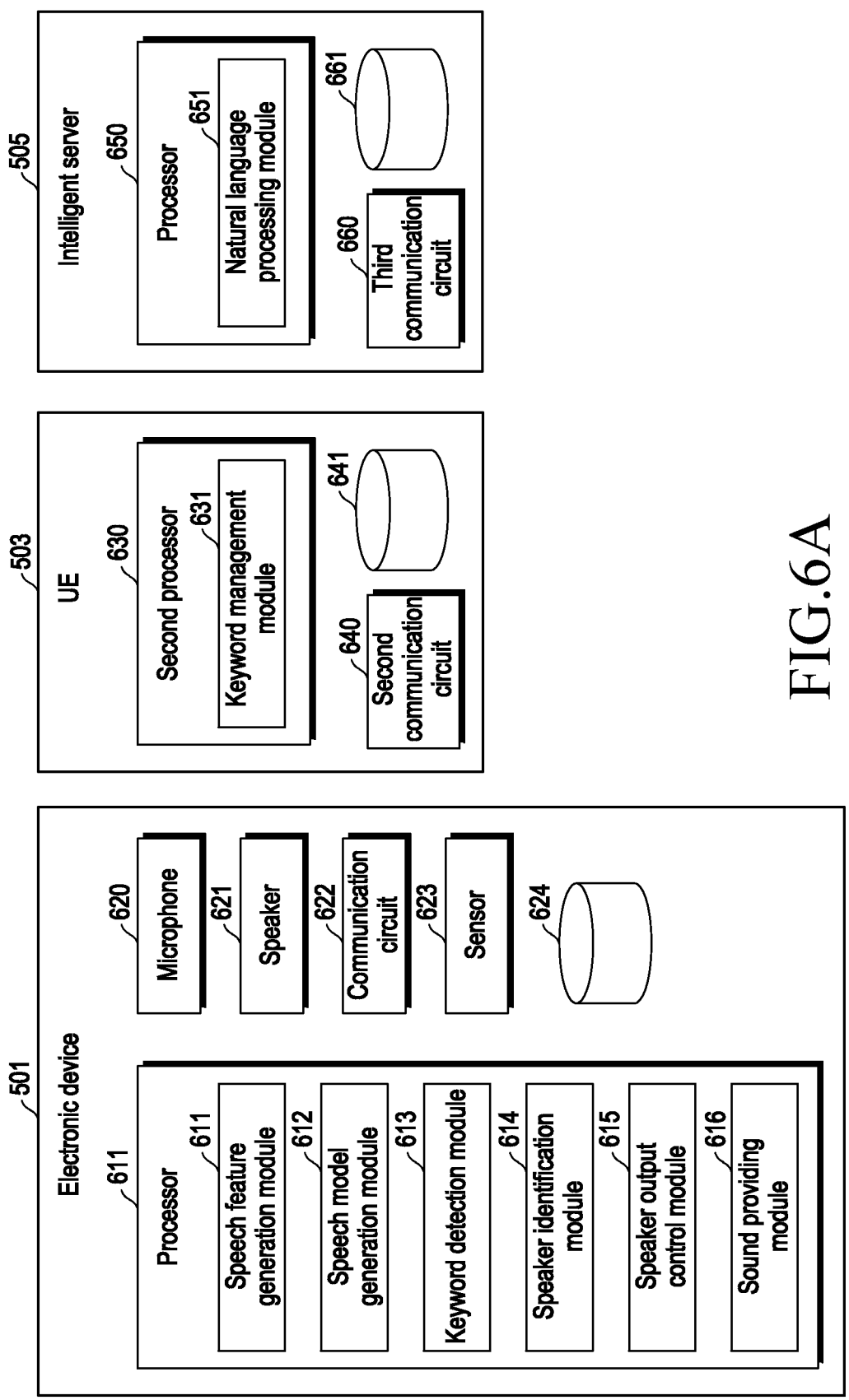
FIG. 6A is a block diagram illustrating an example of the configurations of an electronic device(or a wearable device), a UE, and an intelligent server according to various embodiments.

FIG. 6A is a block diagram illustrating an exemplary configuration of each of the electronic device 501(or a wearable device), the UE 503, and the intelligent server 505 according to various embodiments. Each of the electronic device 501, the UE 503, and the intelligent server 505 may be implemented to include more or fewer components than illustrated in FIG. 6A, and thus are not limited to the components illustrated in FIG. 6A. FIG. 6A will further be described below with reference to FIGS. 6B, 6C and 6D.

Figure 6B:
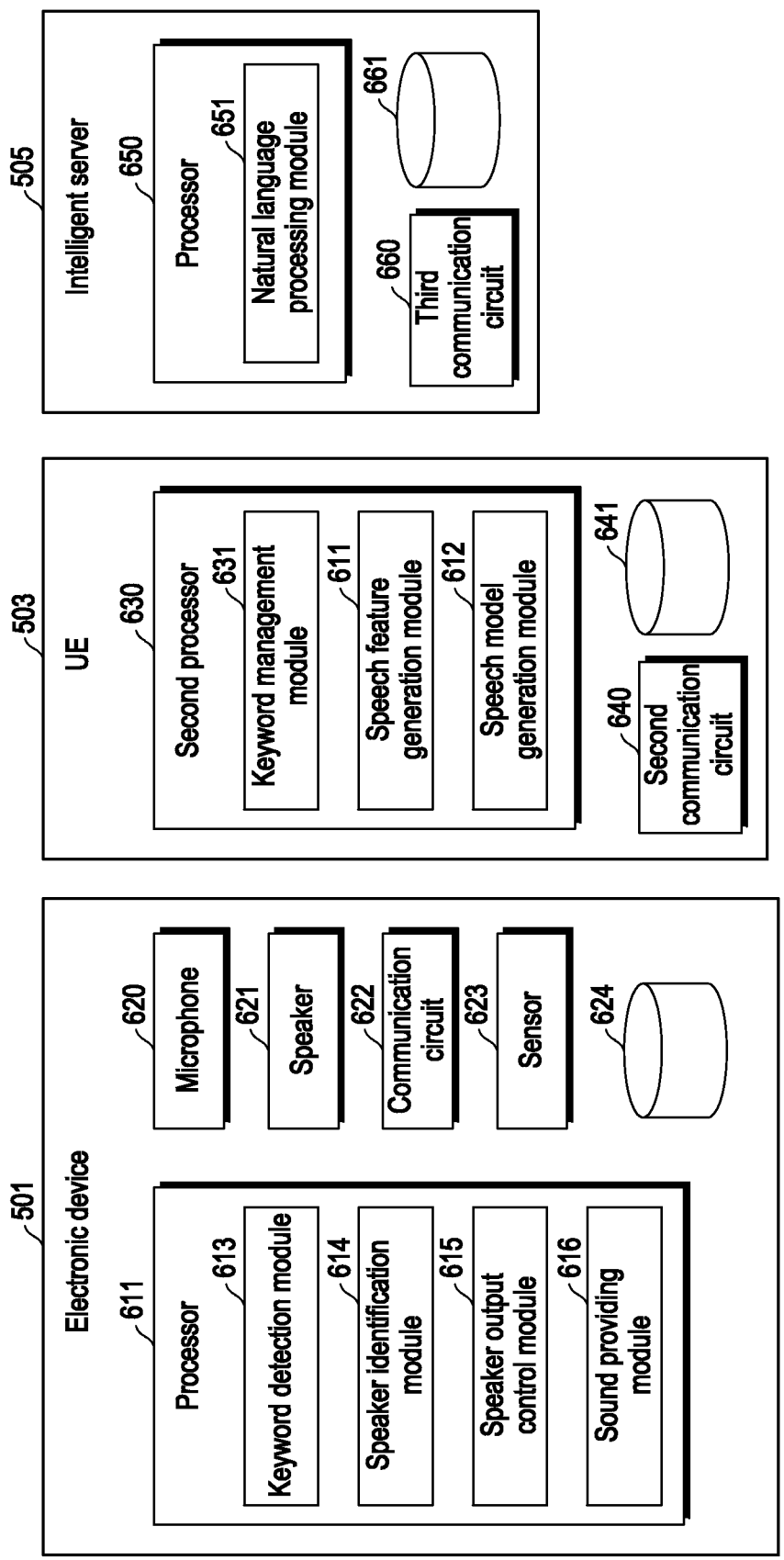
FIG. 6B is a block diagram illustrating another example of the configurations of an electronic device(or a wearable device), a UE, and an intelligent server according to various embodiments.
Figure 6C:
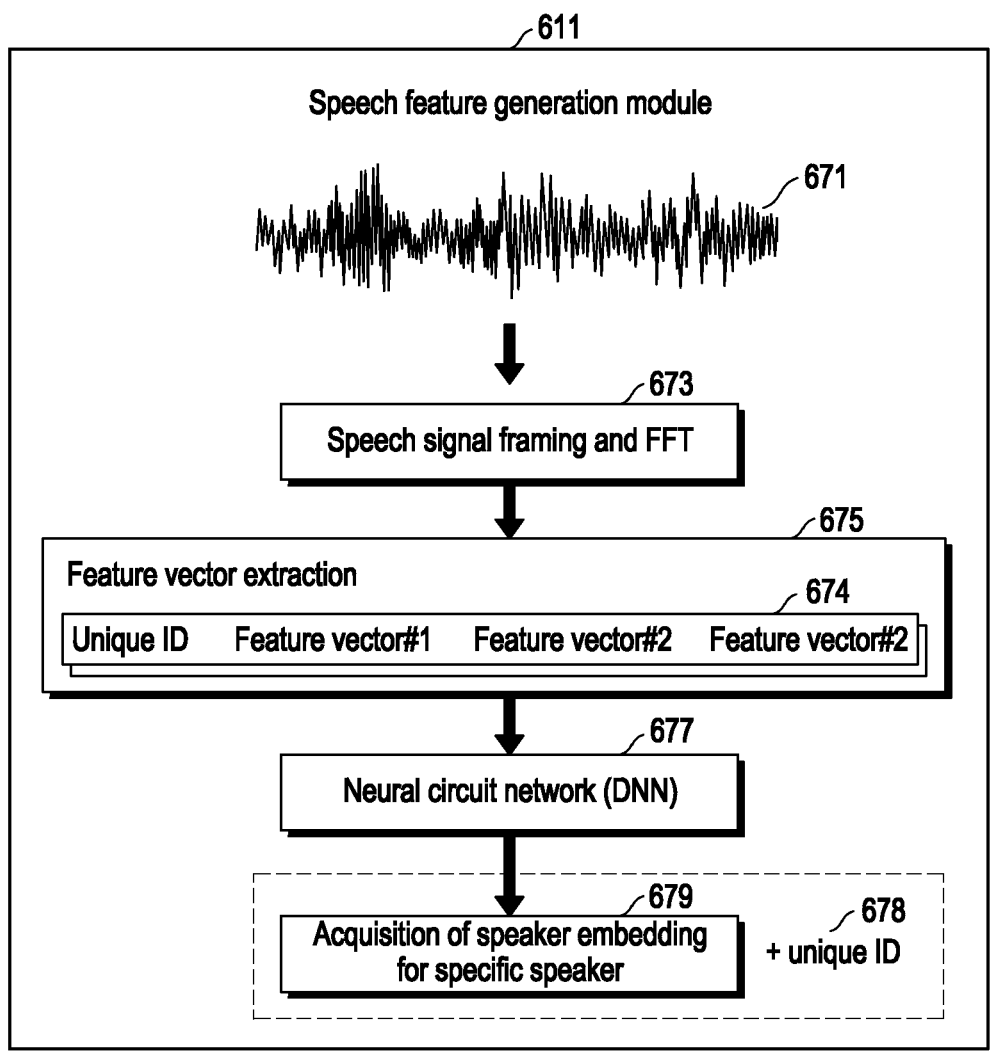
FIG. 6C is a diagram illustrating an exemplary operation of a speech feature generation module according to various embodiments.
Figure 6D:
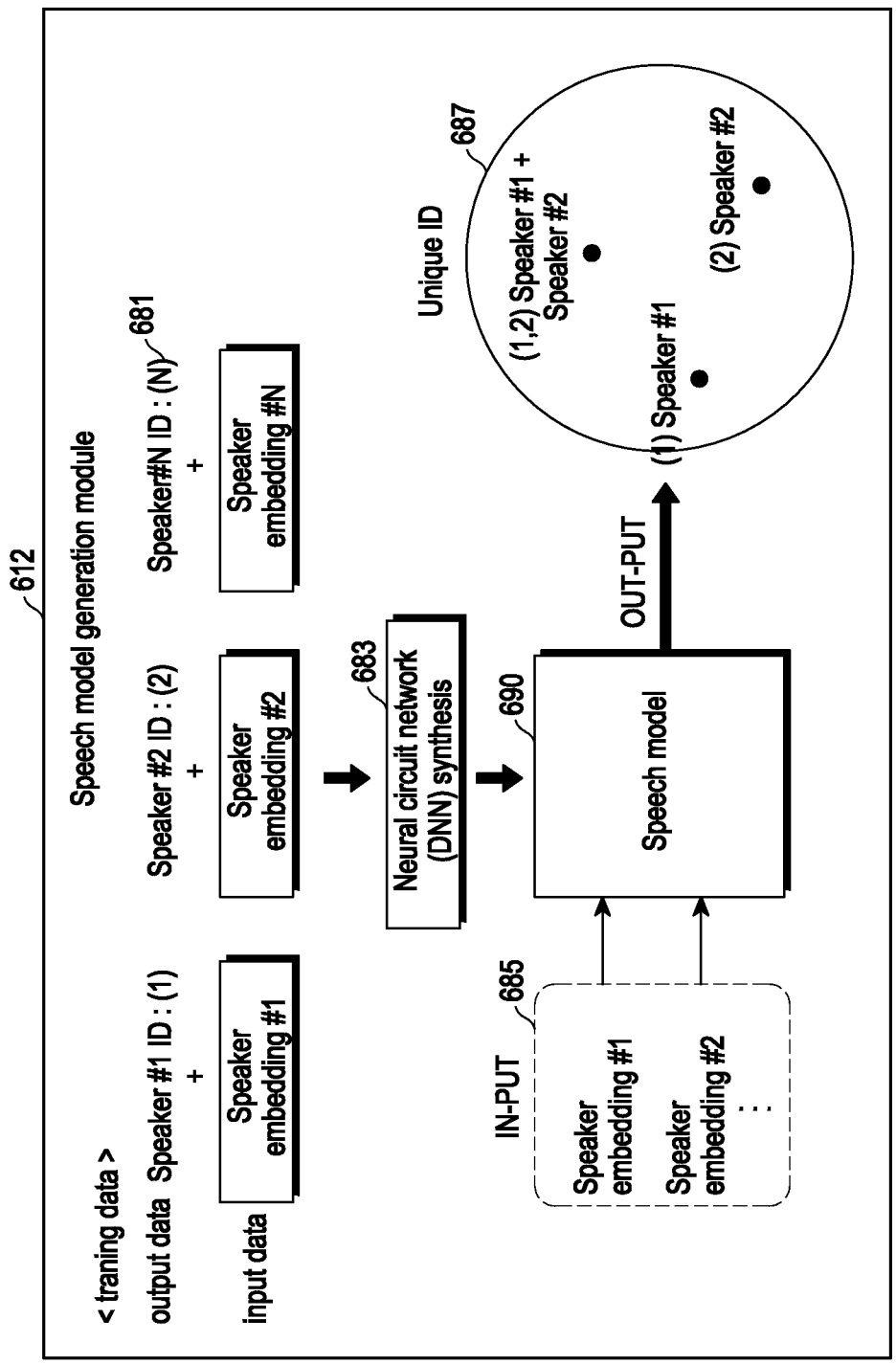
FIG. 6D is a diagram illustrating an exemplary operation of a speech model generation module according to various embodiments.

FIG. 6B is a block diagram illustrating another example of the configurations of an electronic device 501(or a wearable device), a UE 503, and an intelligent server 505 according to various embodiments. FIG. 6C is a diagram illustrating an exemplary operation of a speech feature generation module 611 according to various embodiments. FIG. 6D is a diagram illustrating an exemplary operation of a speech model generation module 612 according to various embodiments.

According to various embodiments, referring to FIG. 6A, the electronic device 501 may include the microphone 620, the speaker 621, a first communication circuit 622, a sensor 623, a first memory 624, and a first processor 610 including a speech feature generation module 611, a speech model generation module 612, a keyword detection module 613, a speaker identification module 614, a speaker output control module 615, and a sound providing module 616. The UE 503 may include a second communication circuit 640, a second memory 641, and a second processor 630 including a keyword management module 631. The intelligent server 505 may include a third communication circuit 660, a DB 661, and a third processor 650 including a natural language processing module 651. The components of each of the devices will be described below.

At least one of the modules included in the processors (for example, the first, second and third processors 610, 630 and 650) of the electronic device 501, the UE 503, and the intelligent server 505 (for example, the speech feature generation module 611, the speech model generation module 612, the keyword detection module 613, the speaker identification module 614, the speaker output control module 615, and the sound providing module 616, the keyword management module 631, and the natural language processing module 651) may be realized and/or implemented in software, firmware, hardware, or a combination of at least two of them. For example, the modules may be implemented in the form of applications, programs, computer code, instructions, routines, or processes executable by the processors of the respective devices. When the modules are executed by the processors of the devices (for example, the first, second and third processors 610, 630 and 650), the modules may cause the processors to perform operations related to the modules (or functions that the modules may provide). Alternatively, the modules may be implemented as hardware (for example, processors or control circuits) separate from the processors (for example, the first, second and third processor 610, 630 and 650) of the devices, not limited to the description and/or the illustration.

Further, the modules may be implemented in different devices, not limited to the description and/or the illustration. For example, at least one of the speech feature generation module 611, the speech model generation module 612, the keyword detection module 613, the speaker identification module 614, the speaker output control module 615, or the sound providing module 616 of the electronic device 501 may be implemented in the UE 503 or the intelligent server 505. Further, for example, the keyword management module 631 of the UE 503 may be implemented in the electronic device 501 or the intelligent server 505. Further, for example, at least one of the natural language processing module 651 or the function providing module of the intelligent server 505 may be implemented in the electronic device 501 or the UE 503. Accordingly, the operations and/or functions of the modules described below may be performed in at least one of the electronic device 501, the UE 503, or the intelligent server 505, not limited to the description and/or the illustration. For example, as illustrated in FIG. 6B, the speech feature generation module 611 and the speech model generation module 612 may be implemented in the UE 503, and the electronic device 501 may receive a speech model generated based on speaker embeddings generated from the UE 503. The modules may be implemented in the respective devices in various examples, not limited to the description and/or the illustration.

An example of the components included in the electronic device 501 according to various embodiments will be described below. While not shown in FIG. 6A, a pair of electronic devices 501 may be implemented (for example, electronic devices 501 worn on the left and right ears are implemented). The components of the electronic device 501 described below may be provided in each of the electronic devices 501 implemented as a pair.

According to various embodiments, the microphone 620 may receive a sound from the outside of the electronic device 501. For example, the electronic device 501 (for example, the first processor 610) may activate the microphone 620 to receive an external sound through the microphone 620. The sound generated in the outside may include speeches (or utterances) of speakers (for example, a user and/or another speaker (or another person), and/or ambient (or background) noise. In one embodiment, there may be a plurality of microphones 620. The electronic device 501 (for example, the first processor 610) may obtain a sound from the electronic device 501 in a specified direction among sounds received from the plurality of microphones 620 by beamforming. The sound obtained from the specified direction may be defined as a sub-sound, based on the received sound. The plurality of microphones 620 may be arranged on the electronic device 501, apart from each other by a predetermined distance, and the sub-sound may be obtained by signal-processing the sound received through each microphone 620 by as much as a time or phase associated with the distance and the direction from which the sound is to be obtained. Since beamforming is a well-known technique, its detailed description will not be provided herein. In an embodiment, when the electronic device 501 is set to dialog mode, the electronic device 501 may obtain a sub-sound from a specified direction by using the plurality of microphones 620, which will be described later with reference to FIGS. 17, 18, 19, and 20. When obtaining a speech using the microphones 620, the electronic device 501 may assign an identifier (ID) (for example, a unique ID) to a specific speaker corresponding to the obtained speech (or to the obtained speech). The time when the ID is assigned may be, but not limited to, when the electronic device 501 (for example, the first processor 610) obtains the speech received through the microphones 620. For example, the ID may be assigned at when feature information for the speech is generated or when the speaker of the speech is identified.

According to various embodiments, the speaker 621 may output various types of sounds. For example, the electronic device 501 (for example, the first processor 610) may receive data for audio output from the UE 503 via a communication connection established using the first communication circuit 622, and output audio through the speaker 621 based on the received data. While not shown, the electronic device 501 may further include an amplifier, and amplify the received audio data by using the amplifier to amplify or adjust (for example, increase or decrease) the volume of the audio output through the speaker 621. Further, for example, the electronic device 501 (for example, the first processor 610) may generate anti-noise to cancel ambient noise (and/or background noise) received through the microphones 620 by using an active noise cancelling (ANC) circuit (not shown) and output the generated anti-noise through the speaker 621, so that the ambient noise incident on the ears of the user may be cancelled and thus the user may not hear the ambient noise. The operation of generating anti-noise in the ANC circuit (not shown) may be a well-known technique and thus will not be described in detail herein. In another example, when the electronic device 501 (for example, the first processor 610) enters the dialog mode through the microphones 620, the electronic device 501 (for example, the first processor 610) may obtain only the speeches of the user and another speaker selected by the user (for example, the other party talking with the user) and output the speeches through the speaker 621 by controlling decrease or non-output (for example, mute) of the volume of media. This operation will be described later in detail.

According to various embodiments, the first communication circuit 622 may establish a communication connection with the UE 503 and/or the intelligent server 505 in any of various types of communication schemes, and transmit and/or receive data via the communication connection. As described above, the communication scheme may be, but not limited to, a communication scheme of establishing a direct communication connection such as Bluetooth and Wi-Fi direct. The communication schemes may include a communication scheme using an AP (for example, Wi-Fi) or a communication scheme based on cellular communication using a BS (for example, 3G, 4G/LTE, or 5G). Because the first communication circuit 622 may be implemented in the same manner as the communication module 190 described before with reference to FIG. 1, duplicative descriptions thereof are omitted.

According to various embodiments, the sensor 623 may include a sensor for detecting movement of the electronic device 501. For example, the sensor 623 may include an acceleration sensor (or a gyro sensor, or an inclination sensor). In addition to and not limited to the above, the sensor 623 may include sensors for determining whether the user has spoken based on vibrations, in addition to the described sensors. For example, the sensor 623 may include sensors such as a motion sensor, a vibration detection sensor (for example, a vibration pickup unit), and a bone conduction sensor (for example, a bone conduction microphone) in addition to the above-described acceleration sensor (or gyro sensor or inclination sensor). In an embodiment, the electronic device 501 may detect a rotation direction (for example, rotation to the left or rotation to the right) and a rotation angle of the electronic device 501 by using the acceleration sensor. In an embodiment, when the user wearing the electronic device 501 utters speech, the electronic device 501 may detect a movement pattern (for example, jaw movements) of the user by the acceleration sensor and identify a time period during which the movement pattern is detected as a user utterance time period. Further, for example, the sensor 623 may include an image sensor (or camera), and the electronic device 501 may photograph the surroundings of the electronic device 501 by using the image sensor.

An example of the modules included in the first processor 610 of the electronic device 501 will be described below. As described above, at least one of the modules included in the first processor 610 may be implemented in the UE 503.

According to various embodiments, the speech feature generation module 611 may generate feature information associated with a speech (or utterance) received at the electronic device 501. The feature information may indicate various acoustic feature patterns present in the speech or various vocal tract shape patterns of a speaker. In an embodiment, the feature information may include a speaker embedding. For example, as illustrated in FIG. 6C, the speech feature generation module 611 may obtain a speech 671 of a specific speaker (for example, the user or another person) received through the microphone 620 (or a speech separated from ambient sound received through the microphone 620). The speech feature generation module 611 may obtain the speech in units of a specified time frame and analyze parts of the speech obtained in units of the specified time frame in the frequency domain (for example, by fast Fourier transform (FFT)) (673). The speech feature generation module 611 may obtain vector values 674 representing features associated with an overall spectral shape, for the respective frames of the analyzed speech (675). The vector values 674 may include parameters such as a linear prediction coefficient (LPC), a linear prediction cepstral coefficient (LPCC), a mel-frequency cepstral coefficients (MFCC), and a perceptual linear prediction coefficient (PLPC). The speech feature generation module 611 may generate a speaker embedding for the above-described specific speaker by learning the vectors values for the respective frames based on a Gaussian mixture model (GMM) supervector, joint factor analysis (JFA), an i-vector algorithm, and/or a deep learning (DNN) algorithm such as d-vector and x-vector (679). The speaker embedding obtained by learning the vector values for the respective frames based on deep learning such as d-vector and x-vector may be one of trained hidden layers. In an embodiment, the speech feature generation module 611 may obtain the speech of the user of the electronic device 501 periodically and/or aperiodically (for example, when the user requests generation of feature information), generate the speaker embedding for the user based on the obtained speech, and store the speaker embedding in the first memory 624 (or transmit the speaker embedding to the UE 503 to be stored in the second memory 641). The speech feature generation module 611 may generate an ID 678 of the speaker (for example, the user or another speaker (or another person)) corresponding to the speaker embedding, and store the generated ID 678 together with the speaker embedding. In an embodiment, when the mode of the electronic device 501 is set to the dialog mode, the speech feature generation module 611 may obtain the speech of a new other person, generate another speaker embedding for the new other person based on the obtained speech, and store the speaker embedding in the first memory 624 (or transmit the speaker embedding to the UE 503 to be stored in the second memory 641). Not limited to what is described above, the electronic device 501 may receive the speaker embedding for the other person from another external electronic device. The feature information may include information representing features that identify various types of speakers as well as the speaker embedding, not limited to the description and/or the illustration. For example, the feature information may include parameters such as an LPC, an LPCC, an MFCC, and a PLPC.

According to various embodiments, the speech model generation module 612 may generate a speech model 690 that identifies a speaker based on feature information (for example, a speaker embedding) generated by the speech feature generation model and the ID (for example, unique ID) of the speaker (for example, the user or another person) corresponding to the feature information. For example, the speech model generation module 612 may generate the speech model 690 by performing learning 683 based on DNN algorithm with a speaker embedding for each speaker and the ID (for example, unique ID) of the speaker used as training data 681. The speech model generation module 612 may generate the speech model 690 by artificial neural network learning with a speaker embedding for each speaker used as input data and the ID (for example, unique ID) of the speaker corresponding to each speaker embedding used as output data. For the input of speaker embeddings 685, the speech model 690 may output the IDs (for example, unique IDs) 687 of speakers. As described later, the electronic device 501 may separate speech from sounds currently received through the microphone 620, input a speaker embedding corresponding to the separated speech to the speech model 690, and identify the ID output from the speech model 690 to distinguish the speech of a specific speaker to be obtained (or selected) from a speech of other speakers to be removed. In an embodiment, the speech model generation module 612 may generate the speech model 690 based on the speaker embedding of the user of the electronic device, which is generated periodically and/or aperiodically as described above, and store the speech model 690 in the first memory 624. In an embodiment, when the mode of the electronic device 501 is set to the dialog mode as described above, the speech model generation module 612 may generate a new speech model by adding an obtained speaker embedding for a new other person as training data for training the speech model 690. Without being limited to the description and/or the illustration, the speech model generation module 612 may generate a speech model based on a speaker embedding for each speaker and the ID (for example, unique ID) of the speaker corresponding to the speaker embedding, without deep learning.

According to various embodiments, the keyword detection module 613 may identify a keyword included in a speech (or utterance) received at the electronic device 501 based on registered keywords. As described later, the electronic device 501 may receive keywords obtained by the keyword management module 631 of the UE 503 or speech information about the keywords. The keyword detection module 613 may identify whether a keyword is included in the received speech, based on the received keywords or the speech information about the keywords. As described later, when the electronic device 501 (for example, the first processor 610) identifies that a keyword is included in the speech, the electronic device 501 may switch to the dialog mode.

According to various embodiments, the speaker identification module 614 may identify whether the speech received at the electronic device 501 is from the user of the electronic device 501. In an embodiment, the speaker identification module 614 may detect whether the user is speaking by using the above-described sensor 623 (for example, the acceleration sensor). When detecting that the user is speaking, the speaker identification module 614 may determine that the currently received speech is from the user. In an embodiment, the speaker identification module 614 may determine whether the currently received speech is from the user based on the speaker embedding of the user or the speech model described above. As described later, upon detection of a speech of the user, the electronic device 501 (for example, the first processor 610) may switch to the dialog mode.

According to various embodiments, the speaker output control module 615 may control (for example, decrease or increase) the volume of audio output through the speaker 621. In an embodiment, when the electronic device 501 is in the dialog mode, the first processor 610 (for example, the speaker output control module 615) may decrease the volume of audio currently being output through the speaker 621 by as much as a specified value (or a specified level) or stop (for example, mute) the audio output.

According to various embodiments, the sound providing module 616 may perform at least one operation for providing a specific sound in the sounds received through the microphone 620 to the user. For example, as described later, when the electronic device 501 is in the dialog mode, the sound providing module 616 may separate speeches from the sounds (i.e. sounds including ambient noise) received through the microphone 620, identify speakers corresponding to the speeches, selectively obtain the speech of at least one speaker (for example, the user and another person selected by the user) based on the identification, and provide the obtained speech to the user. As described later, the at least one speaker may be preset as the user and another person who is talking with the user or may be a speaker selected by the user.

Now, description will be given of an example of the configuration of the UE 503 according to various embodiments. The configuration of the UE 503 is not limited to that illustrated in FIG. 6A, and the UE 503 may further include the configuration of the electronic device 101 described in FIG. 1 and/or the configuration of the UE 290 described before with reference to FIGS. 2, 3 and 4. Accordingly, duplicative descriptions thereof are omitted.

According to various embodiments, the second communication circuit 640 may establish a communication connection with the electronic device 501 and/or the intelligent server 505 in various types of communication schemes, and transmit and/or receive data via the communication connection. Because the second communication circuit 640 may be implemented in the same manner as the first communication circuit 622, duplicative descriptions thereof are omitted.

According to various embodiments, the keyword management module 631 included in the second processor 630 may obtain a keyword and store the keyword in the second memory 641. In an embodiment, the keyword management module 631 may receive a keyword from the user. For example, the keyword management module 631 may provide an interface (for example, an execution screen or a setting window) for registering a keyword, obtain a keyword which is specific text from the user through the interface, and store the keyword in the memory. For example, the specific text may be the user's name. In another embodiment, the keyword management module 631 may obtain and store a nickname or ID registered in the user's account as the keyword. In an embodiment, the keyword management module 631 may extract a keyword from a message or a phone call transmitted to and/or received from the UE 503. In an embodiment, the keyword management module 631 may generate text similar to the obtained keyword as a keyword. For example, when obtaining "Kim Samsung" as a keyword, the keyword management module 631 may generate similar text, such as "Samsung" and "Mr. Samsung" similar to "Kim Samsung" as keywords. The keyword management module 631 may generate speeches for the keywords based on the textual keywords. In an embodiment, the keyword management module 631 may provide a recording function, record a keyword uttered by the user, and perform the above-described operation. Keywords or speech information for the keywords, stored in the second memory 641 of the UE 503 may be transmitted to the electronic device 501 and stored/managed in the first memory 624 of the electronic device 501.

An example of the configuration of the intelligent server 505 according to various embodiments will be described below. The configuration of the intelligent server 505 is not limited to that illustrated in FIGS. 2, 3 and 4, and may further include the configuration of the intelligent server 505 described above in FIGS. 2, 3 and 4. Therefore, duplicative descriptions thereof are omitted.

According to various embodiments, the third communication circuit 660 may establish a communication connection with the electronic device 501 and/or the UE 503 in any of various types of communication schemes, and transmit and/or receive data via the communication connection. Because the third communication circuit 660 may be configured in the same manner as the first communication circuit 622, duplicative descriptions thereof are omitted.

According to various embodiments, the natural language processing module 651 is configured in the same manner as the natural language platform 220 described before with reference to FIGS. 2, 3 and 4. The natural language processing module 651 may analyze a speech received from the UE 503 and/or the electronic device 501 and return result information for providing the speech recognition service.

An example of an operation of the electronic device 501 according to an embodiment will be described below.

According to various embodiments, when the electronic device 501 identifies an utterance including a specified keyword while outputting a sound through the speaker 621, the electronic device 501 may decrease the volume of audio (for example, media or anti-noise) output through the speaker 621) or stop the sound output.

Figure 7:
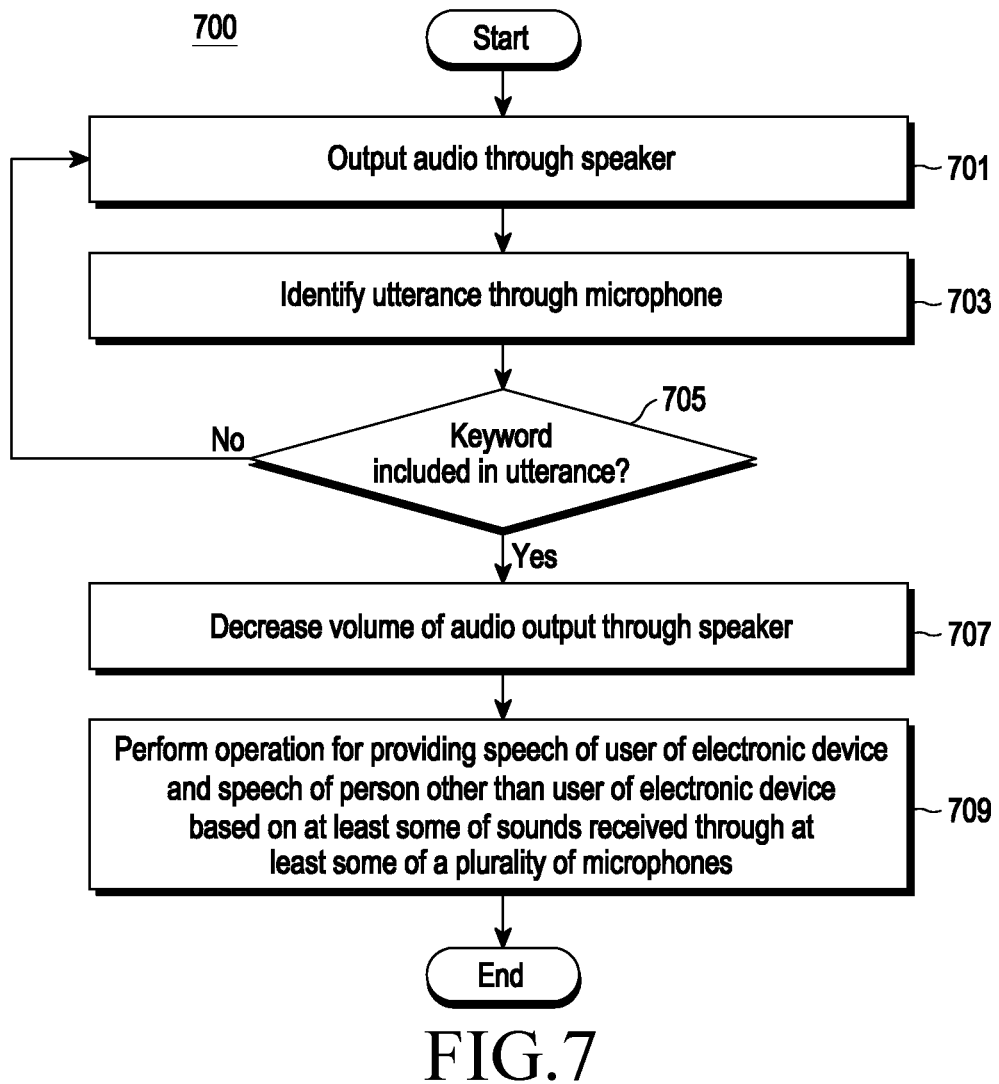
FIG. 7 is a flowchart illustrating an exemplary operation of a wearable device according to various embodiments.

FIG. 7 is a flowchart 700 illustrating an exemplary operation of the electronic device 501 according to various embodiments. The operations illustrated in FIG. 7 may be performed in various orders, not limited to the illustrated order. In addition, according to various embodiments, more or fewer operations than the operations illustrated in FIG. 7 may be performed. Hereinbelow, FIG. 7 will be described with reference to FIGS. 8, 9, 10A, and 10B.

Figure 8:
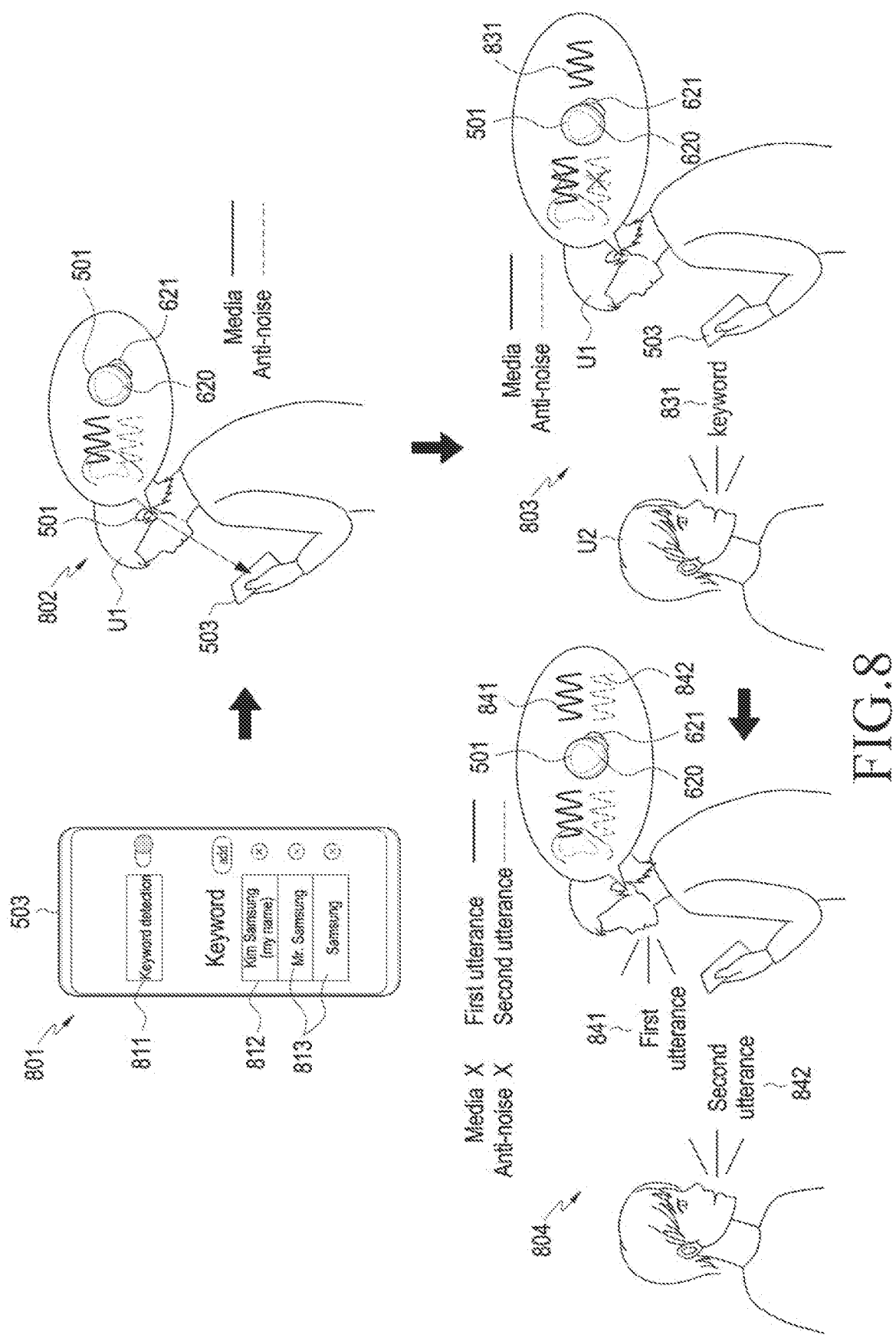
FIG. 8 is a diagram illustrating an exemplary operation of setting the mode of a wearable device to dialog mode according to keyword identification of the wearable device according to various embodiments.
Figure 9:
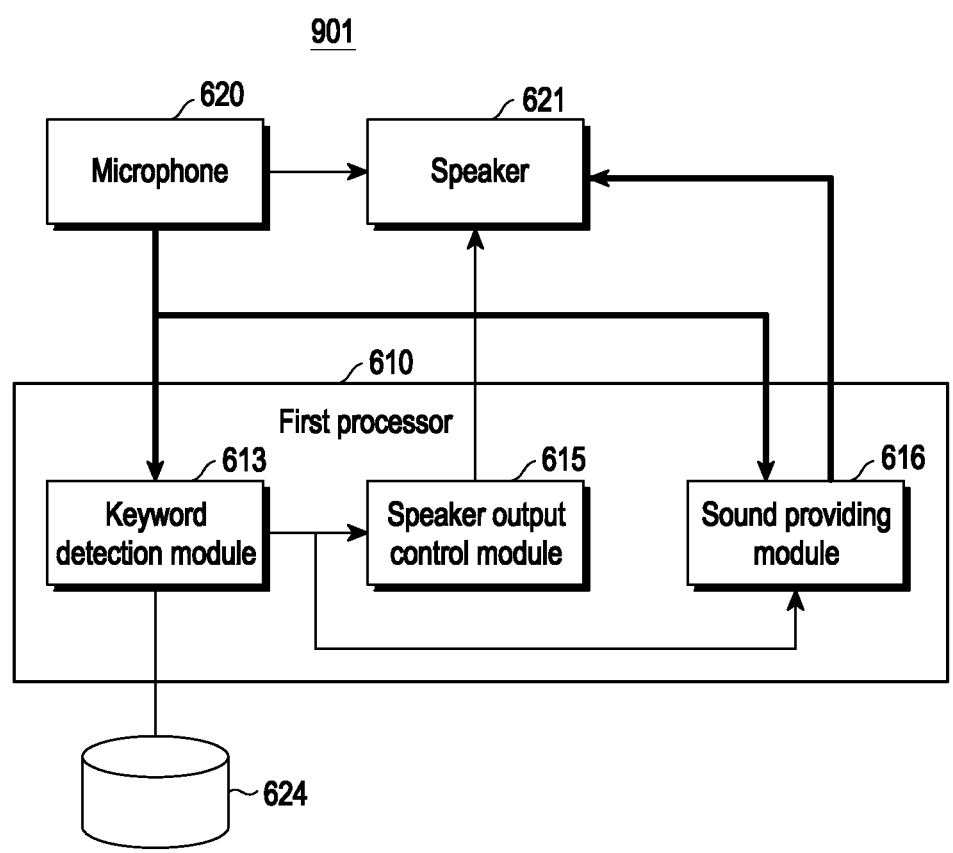
FIG. 9 is a block diagram illustrating operations of modules included in a wearable device according to various embodiments.
Figure 10A:
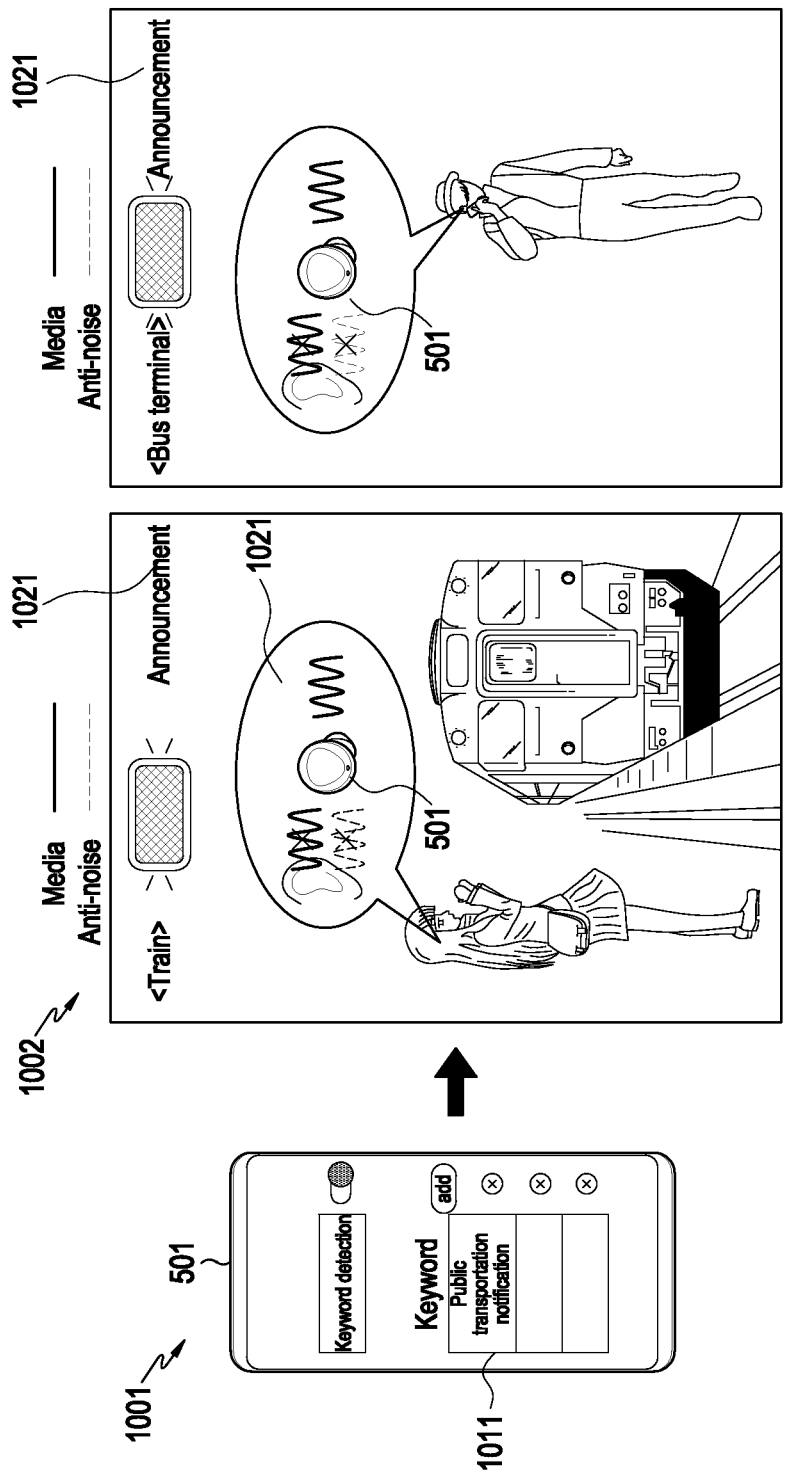
FIG. 10A is a diagram illustrating an example of keywords registered to a wearable device or an electronic device according to various embodiments.
Figure 10B:
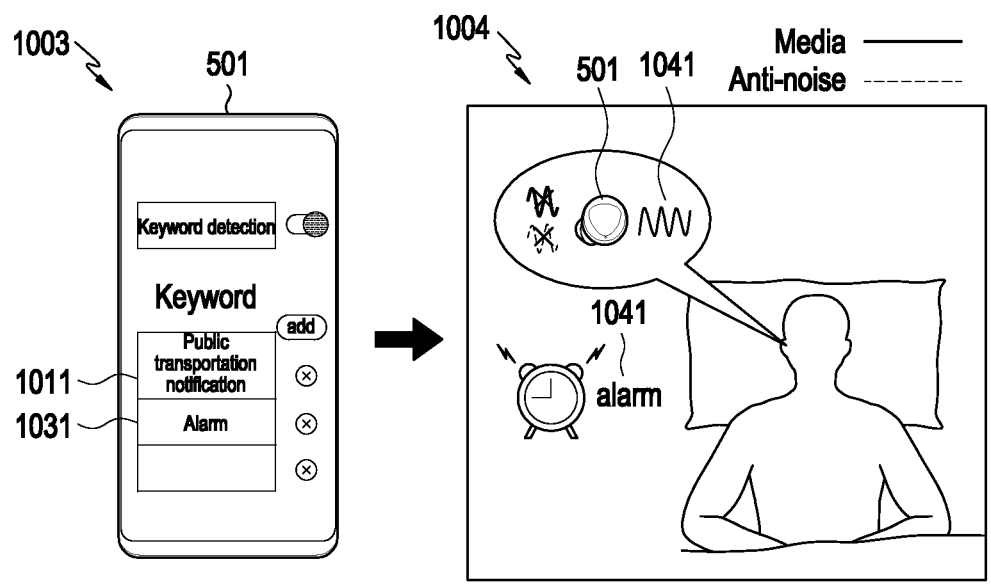
FIG. 10B is a diagram illustrating another example of keywords registered to a wearable device or an electronic device according to various embodiments.

FIG. 8 is a diagram illustrating an exemplary operation of setting the mode of the electronic device 501 to the dialog mode according to keyword identification of the electronic device 501 according to various embodiments. FIG. 9 is a diagram illustrating operations of modules included in the electronic device 501 according to various embodiments. FIG. 10A is a diagram illustrating an example of keywords registered in the electronic device 501 or the UE 503 according to various embodiments. FIG. 10B is a diagram illustrating another example of keywords registered in the electronic device 501 or the UE 503 according to various embodiments.

According to various embodiments, the electronic device 501 may output audio through the speaker 621 in operation 701. For example, the electronic device 501 (for example, the first processor 610) may establish a communication connection with the UE 503, receive audio data from the UE 503 based on the established communication connection, and output audio through the speaker 621 based on the received audio data, as indicated by reference numeral 802 in FIG. 8. The audio data may be generated by an application (for example, a music play application or a video play application) executed and/or activated by the UE 503. Further, for example, the electronic device 501 (for example, the first processor 610) may generate anti-noise to cancel ambient noise (and/or background noise) received through the microphone 620 by using an ANC circuit (not shown) and output the anti-noise through the speaker 621.

According to various embodiments, the electronic device 501 may identify (or receive) an utterance through a microphone(for example, at least one of the plurality of microphones 620) in operation 703, and identify whether a keyword is included in the utterance in operation 705. For example, the electronic device 501 may receive a speech through a microphone 620 while outputting audio (for example, audio output based on audio data or anti-noise output) through the speaker 621. For example, as indicated by reference numeral 803 in FIG. 8, the electronic device 501 may obtain a speech (or utterance) 831 of another speaker (or another person) U2 who wants to talk with the user U1 of the electronic device 501 through the microphone 620. Not limited to the description and/or the illustration, the electronic device 501 may also obtain the speech (or utterance) of the user U1 of the electronic device 501 through the microphone 620. The electronic device 501 (for example, the keyword detection module 613) may extract (or separate) a speech (or utterance) from the sound received through the microphone 620 and identify whether a keyword is included in the obtained speech (or utterance) based on information about keywords stored in the memory 624, as illustrated in FIG. 9. For example, the information about the keywords may be received from the UE 503. For example, the UE 503 (for example, the keyword management module 631) may provide an interface 811 for keyword registration to the user as indicated by reference numeral 801 of FIG. 8, receive and store a keyword associated with the user of the electronic device 501 (for example, "Kim Samsung" 812, which is the name of the user U1), store text 813 similar to the entered keyword 812 (for example, "Samsung" and "Mr. Samsung") as keywords, and/or store speech information about the keywords. Whether to execute a keyword detection function may also be set on the interface 811. Other embodiments of obtaining a keyword by the UE 503 may be implemented in the same manner as the operation of the keyword management module 631 described before with reference to FIG. 6A, and thus, duplicative descriptions thereof are omitted. In an embodiment, the electronic device 501 (for example, the keyword detection module 613) may convert the obtained speech (or utterance) 831 into text and identify whether a keyword is included in the speech (or utterance) 831 based on the text. The electronic device 501 (for example, the keyword detection module 613) may convert the speech 831 into text by using the ASR module (not shown), and compare parts of the text with the keywords. When the electronic device 501 (for example, the keyword detection module 613) identifies a part of the text corresponding to the keywords based on the result of the comparison, the electronic device 501 may identify that a keyword is included in the speech 831. When the electronic device 501 (for example, the keyword detection module 613) fails to identify a part of the text corresponding to the keywords based on the comparison result, the electronic device 501 may identify that a keyword is not included in the speech 831. In an embodiment, the electronic device 501 (for example, the keyword detection module 613) may compare the speech 831 with speech information for the keywords, and identify whether a keyword is included in the speech 831 based on the comparison result. When a score (for example, similarity score) given according to the result of comparing the speech 831 with the speech information for the keywords is equal to or larger than a preset value, the electronic device 501 may identify that a keyword is included in the speech 831. When the score is less than the preset value, the electronic device 501 may identify that a keyword is not included in the speech 831. When the electronic device 501 identifies that a keyword is included in the speech acquired in operation 705, the electronic device 501 may set its mode to the dialog mode. For example, the dialog mode may be a mode that triggers an operation of controlling the volume of audio output through the speaker 621 of the electronic device 501 (operation 707) (or an external sound listening function) and an operation of selectively providing the speech of a speaker (operation 709) (or an external sound concentration function). Alternatively, the electronic device 501 may perform operations 707 and 709 described below based on the keyword identification without setting its mode.

According to various embodiments, when the received speech (or utterance) is not from the user U1 of the electronic device 501 (i.e. when the received speech or utterance is from another person), the electronic device 501 (for example, the keyword detection module 613) may perform the above-described keyword identification operation 705. The electronic device 501 (for example, the speaker identification module 614) may identify whether the currently received speech is from the user U1 by using the sensor 623 or a pre-generated speech model (for example, the speech model 690 in FIG. 6D), as described before with reference to FIG. 6D. When identifying that the currently received speech is not from the user U1, the electronic device 501 may perform the keyword identification operation. When the currently received voice is from the user U1, the electronic device 501 may identify the duration of the received speech and compare the identified duration with a preset threshold (for example, T_start). When the duration is equal to or greater than the preset threshold, the electronic device 501 may set its mode to the dialog mode. However, not limited to the above description, the electronic device 501 may perform the keyword detection operation (operation 705) even when the currently received voice is from the user U1. In this case, the electronic device 501 may switch to the dialog mode based on at least one of the keyword detection operation 705 or the operation of comparing the duration of the received speech (or utterance) with the preset threshold (for example, T_start).

According to various embodiments, the electronic device 501 (or the UE 503) may register keywords related to various situations in addition to a keyword related to the user U1. In an embodiment, the UE 503 may register text 1011 (for example, text corresponding to speeches used for announcements) and/or speech information (for example, speeches used in announcements) associated with a situation such as a public transportation notification, as indicated by reference numeral 1001 in FIG. 10A. When an announcement 1021 is received through the microphone 620, the electronic device 501 may switch to the dialog mode based on the registered text and/or speech information, as indicated by reference numeral 1002 in FIG. 10A. In an embodiment, the UE 503 may register text 1031 (for example, text corresponding to alarms) and/or speech information (for example, alarms) associated with a situation such as an alarm, as indicated by reference numeral 1003 in FIG. 10B. When an alarm 1041 is received through the microphone 620 as indicated by reference numeral 1004 in FIG. 10B, the electronic device 501 may switch to the dialog mode based on the registered text and/or speech information. In addition to the above-described embodiments, various keywords may be registered. The keywords may be pre-generated by a manufacturer of the electronic device 501 or the UE 503 and provided to the electronic device 501 or the UE 503.

According to various embodiments, based on the identification that a specified keyword is included in the utterance, the electronic device 501 may decrease the volume of audio output through the speaker 621 in operation 707. In operation 709, the electronic device 501 may perform the operation for providing the speech of the user U1 of the UE 503 and a speech of the person U2 other than the user U1 of the UE 503 based on at least a part of an ambient sound received through at least one of the plurality of microphones 620. For example, as illustrated in FIG. 9, the electronic device 501 (for example, the speaker output control module 615) may control the speaker 621 to reduce the volume of the audio output through the speaker 621 or stop the audio output, and/or stop anti-noise output as indicated by reference numeral 803 in FIG. 8. In addition, for example, the electronic device 501 (for example, the sound providing module 616) may perform the operation of providing the user U1 with the speech of at least one speaker selected by the user U1 and/or the speech of at least one preset speaker in the various sounds received through the microphones 620 as illustrated in FIG. 9. For example, the electronic device 501 may perform the operation of providing the user U1 with a first speech (or first utterance 841) of the user U1 of the electronic device 501 and a second speech (or second utterance 842) of the person U2 other than the user U1 of the electronic device 501 in the sounds received through the microphones 620, as indicated by reference numeral 804 in FIG. 8. In another example, while not shown, the electronic device 501 may perform the operation of providing the speech (or utterance) of a speaker selected by the user U1. The operation of providing the speech of at least one speaker in the sounds received through the microphones 620 of the electronic device 501 (for example, the sound providing module 616) may include an operation of separating speeches from the sounds, an operation of identifying speakers corresponding to the speeches, or an operation of providing speeches corresponding to selected speakers based on the identification of the speakers, which will be described in detail with reference to FIGS. 17, 18, 19, and 20.

According to various embodiments, when the electronic device 501 identifies that a keyword is not included in the speech (or utterance), the electronic device 501 may maintain the audio output through the speaker 621. Alternatively, when the electronic device 501 identifies that the speech (or utterance) does not include a keyword, the electronic device 501 may identify whether the obtained speech (or utterance) is from the user U1, as described before. When the obtained speech (or utterance) is from the user U1, the electronic device 501 may perform operations 707 and 709 based on the operation of identifying the duration of the speech and comparing the duration with a threshold (for example, perform operations 707 and 709, when the duration of the speech is equal to or larger than the threshold).

According to various embodiments, when the speech of the user or another speaker (or another person) U2 has not been received through the microphone 620 for a specified time or longer, the electronic device 501 may identify that the dialog mode has ended. When the dialog mode of the electronic device 501 ends, the electronic device 501 may resume the operation of outputting audio and/or anti-noise through the speaker 621.

Another exemplary operation of the electronic device 501 according to various embodiments will be described below. The above-described exemplary operation of the electronic device 501 may be applied to another exemplary operation of the electronic device 501 described below.

According to various embodiments, the electronic device 501 may identify a keyword in an obtained speech (or utterance) and set its mode to the dialog mode, when a specified condition is satisfied. Satisfaction of the specified condition may include reception of a user speech (or utterance) or identification of the user's conversation intention by using the sensor 623.

Figure 11:
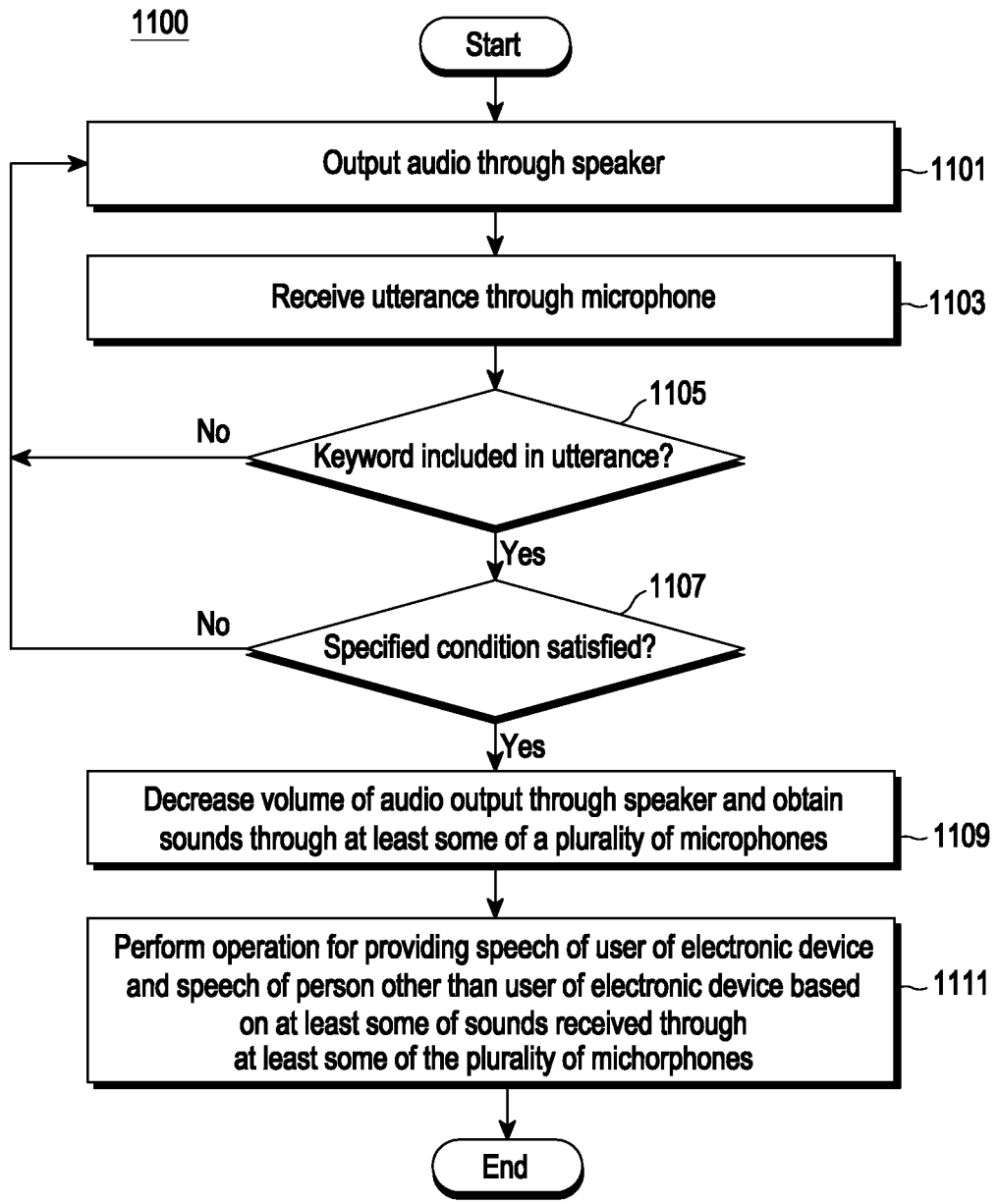
FIG. 11 is a flowchart illustrating an exemplary operation of a wearable device according to various embodiments.

FIG. 11 is a flowchart 1100 illustrating an exemplary operation of the electronic device 501 according to various embodiments. The operations illustrated in FIG. 11 may be performed in various orders, not limited to the illustrated order. According to various embodiments, more or fewer operations than the operations illustrated in FIG. 11 may be performed. FIG. 11 will be described with reference to FIGS. 12, 13A and 13B.

Figure 12:
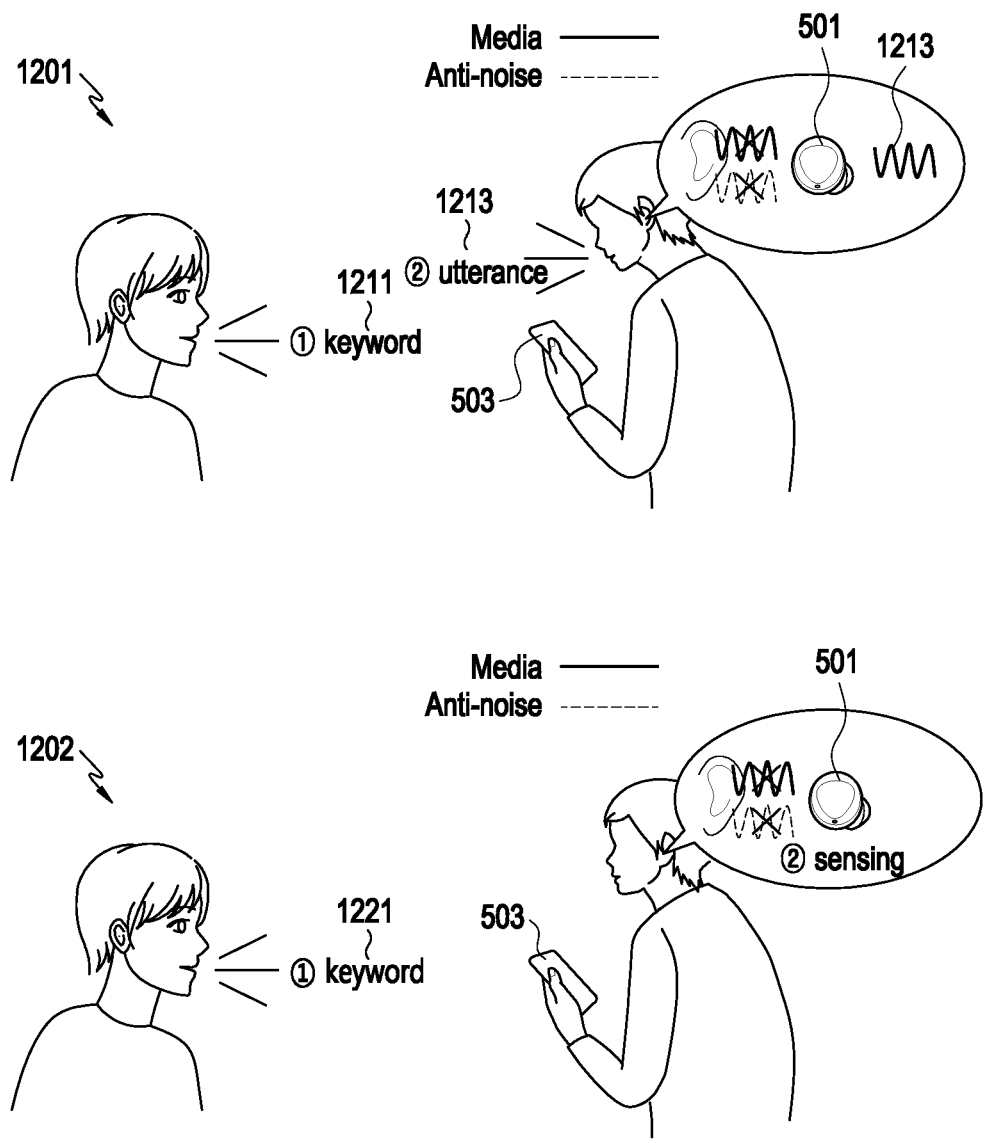
FIG. 12 is a diagram illustrating an exemplary operation of identifying whether a specified condition is satisfied by a wearable device according to various embodiments.
Figure 13A:
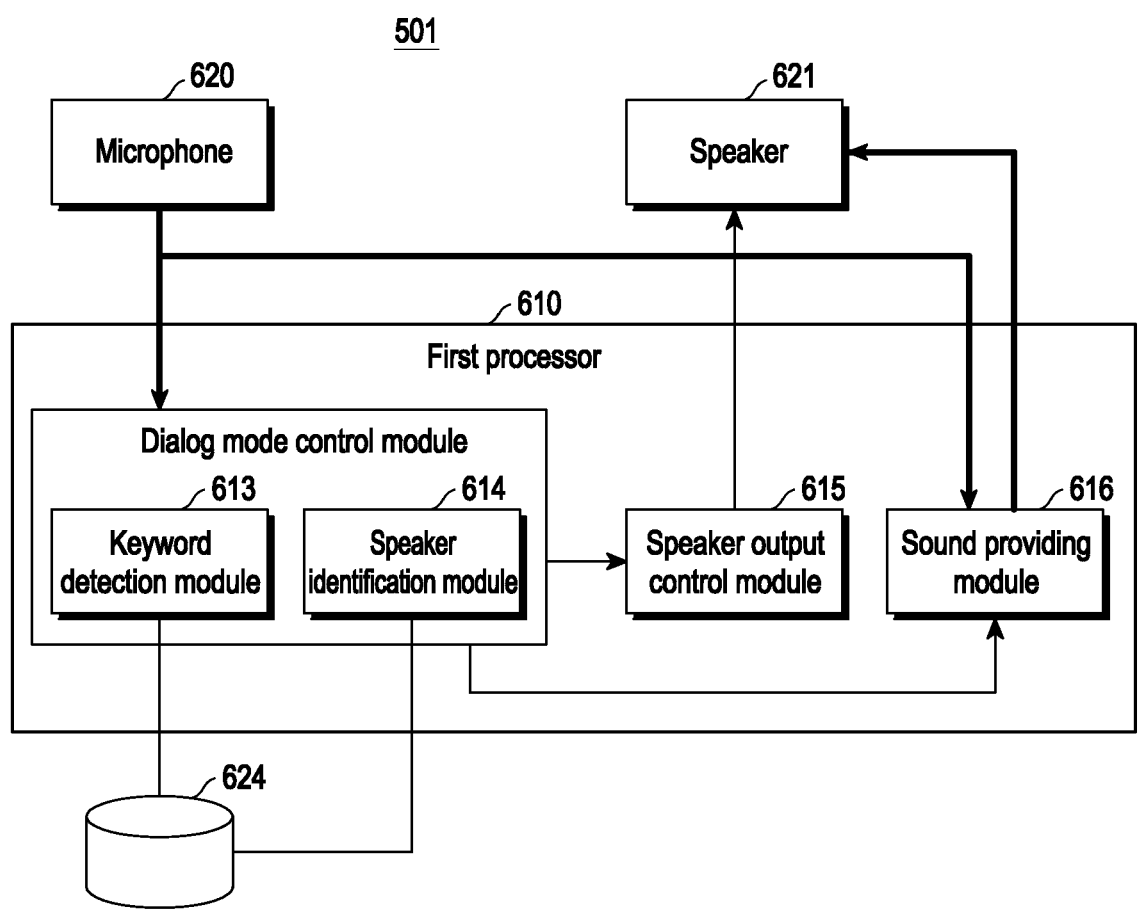
FIG. 13A is a diagram illustrating operations of modules included in a wearable device according to various embodiments.
Figure 13B:
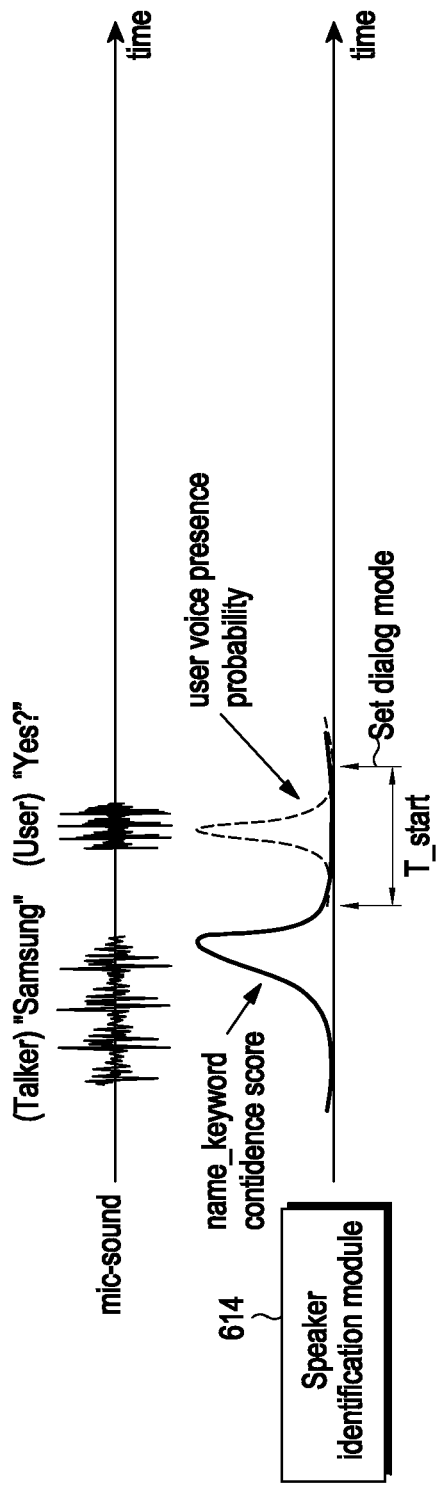
FIG. 13B is a diagram illustrating an exemplary operation of identifying an utterance of a user by a wearable device according to various embodiments.

FIG. 12 is a diagram illustrating an example of an operation of identifying whether a specified condition is satisfied by the electronic device 501 according to various embodiments. FIG. 13A is a diagram illustrating operations of modules included in the electronic device 501 according to various embodiments. FIG. 13B is a diagram illustrating an example of an operation of identifying a user utterance by the electronic device 501 according to various embodiments.

According to various embodiments, the electronic device 501 may output audio through the speaker 621 in operation 1101. For example, the electronic device 501 (for example, the first processor 610) may output audio through the speaker 621 based on audio data or may generate anti-noise to cancel ambient noise (and/or background noise) and output the anti-noise through the speaker 621. Since operation 1101 of the electronic device 501 may be performed in the same manner as operation 701 of the electronic device 501 described above, duplicative descriptions thereof are omitted.

According to various embodiments, the electronic device 501 may identify (or receive) an utterance through a microphone (for example, at least one of the plurality of microphones 620) in operation 1103 and identify whether a specified keyword is included in the utterance in operation 1105. For example, the electronic device 501 (for example, the keyword detection module 613) may identify whether a keyword (for example, 1211 or 1221 in FIG. 12) is included in the utterance received through the microphone 620 based on keywords and/or speech information for the keywords, stored in the first memory 624, as illustrated in FIG. 13A. Since operations 1103 and 1105 of the electronic device 501 may be performed in the same manner as operations 703 and 705 of the electronic device 501 described above, duplicative descriptions thereof are omitted.

According to various embodiments, the electronic device 501 may identify whether a specified condition is satisfied after the identification that the specified keyword is included in the utterance in operation 1107. For example, satisfying the specified condition may include identifying a user utterance as indicated by reference numeral 1201 in FIG. 12 or identifying the user's conversation intention by using the sensor 623 as indicated by reference numeral 1202 in FIG. 12. In an embodiment, when the electronic device 501 detects a keyword by the keyword detection module 613 and a user utterance by using the speaker identification module 614, the electronic device 501 may set its mode to the dialog mode. Therefore, the keyword detection module 613 and the speaker identification module 614 may be defined as a dialog mode control module. An embodiment of each of the cases 1201 and 1202 of FIG. 12 will be described below.

According to various embodiments, upon detection of a keyword by the keyword detection module 613, the electronic device 501 (for example, the speaker identification module 614) may identify that the user utters speech as indicated by reference numeral 1213 by using at least one of a sensed value, user feature information (for example, a speaker embedding), or a pre-generated speech model (for example, the speech model 690 in FIG. 6D) in the case 1201 of FIG. 12. In an embodiment, when the user utters speech, the electronic device 501 (for example, the speaker identification module 614) may obtain a sensor value generated according to movement of a part of the user's body (for example, the jaw) by using the sensor 623, and may identify that the currently received speech 1213 (or utterance) is from the user based on acquisition of the sensor value. In an embodiment, the electronic device 501 (for example, the speaker identification module 614) may compare a speaker embedding of the user pre-stored in the memory with the speaker embedding of the speech received after the keyword detection, and identify that the currently received speech 1213 (or utterance) is from the user based on the result of the comparison. For example, when the electronic device 501 (e.g., the speaker identification module 614) starts to receive the sound 1213 after the keyword is detected (or from a time when a keyword detection probability based on the similarity between the received speech and the keyword is less than a specified value), the electronic device 501 may separate speech from the received sound 1213, generate a speaker embedding for the speech by using the speech feature information generation module, and compare the speaker embedding with a pre-stored speaker embedding of the user. The electronic device 501 (e.g., the speaker identification module 614) may calculate a user utterance presence probability based on the result of the comparison between the embeddings as illustrated in FIG. 13B (for example, as the similarity between the embeddings increases, the probability increases). When the identified probability is equal to or greater than a preset value, the currently received speech 1213 may be detected as the user's speech. In an embodiment, the electronic device 501 (for example, the speaker identification module 614) may identify that the currently received speech is the user's speech by using the speech model generated based on the user's speaker embedding stored in the memory. The electronic device 501 (for example, the speaker identification module 614) may further determine whether the detected user utterance is maintained for a predetermined threshold (for example, T_start) or longer. When the duration of the detected user utterance is equal to or greater than the preset threshold (for example, T_start), the electronic device 501 may identify that the specified condition is satisfied, which should not be construed as limiting.

In addition, according to various embodiments, upon detection of a keyword by the keyword detection module 613, the electronic device 501 (for example, the first processor 610) may identify the user's conversation intention based on at least one pattern being identified by using the sensor 623 (for example, the acceleration sensor). For example, the pattern may represent a pattern of values sensed by the sensor 623 according to a user action (or movement of a body part) performed when the user intends to talk. In an embodiment, the pattern may represent a pattern of values sensed when the user moves his or her head for a conversation. Information about the pattern of the values may be pre-stored in the electronic device 501. For example, as indicated by reference numeral 1202 in FIG. 12A, the information about the pattern of the values may include a pattern of values generated from the sensor 623, when the user raises his or her head, looks ahead, and maintains his or her head for a specified period of time, while wearing the electronic device 501. After the keyword detection, the electronic device 501 may compare values received from the sensor 623 with the value pattern. When the electronic device 501 identifies that the obtained values match the value pattern based on the comparison result (for example, when the similarity is equal to or greater than a preset value), the electronic device 501 may determine that the user intends to conduct a conversation, and identify that the currently received utterance is from the user. Further, for example, the pattern may represent a pattern of values sensed by the sensor 623 according to a user's action (or movement of a body part) performed when the user does not intend to communicate. In an embodiment, the pattern may represent a pattern of values sensed by the sensor 623 when the user turns his or her head to find a partner to talk to and moves his or her head back to its original position because there is no one to talk to. After the keyword detection, the electronic device 501 may compare values received from the sensor 623 with the pattern of values generated according to the user's action (or movement of a body part movement) performed when the user does not intend to communicate. When the obtained values match the pattern of the values based on the comparison result (for example, when the similarity is equal to or greater than a preset value), the electronic device 501 may determine that the user does not intend to conduct a conversation.

According to various embodiments, when the electronic device 501 identifies that a keyword is not included in the utterance, the electronic device 501 may maintain audio output through the speaker 621. Alternatively, when identifying that a keyword is not included in the utterance, the electronic device 501 may identify whether the obtained utterance is from the user as described above. When the obtained utterance is from the user, the electronic device 501 may perform an operation of identifying the duration of the utterance and comparing the duration with a threshold (for example, T_start). The compared threshold (for example, T_start) may be set longer than the threshold (for example, T_start) for the case where a keyword is detected.

According to various embodiments, the electronic device 501 may decrease the volume of audio output through the speaker 621 based on the identification that the specified condition is satisfied in operation 1109, and provide the speech of the user of the UE 503 and the speech of another person U2 based on at least a part of the ambient sound received through at least one of the plurality of microphones 620 in operation 1111. Because operations 1109 and 1111 of the electronic device 501 may be performed in the same manner as operations 707 and 709 of the electronic device 501 described above, duplicative descriptions thereof are omitted.

Another exemplary operation of the electronic device 501 according to various embodiments will be described below. The above-described example of the operation of the electronic device 501 may be applied to another example of the operation of the electronic device 501 described below.

According to various embodiments, when the mode of the electronic device 501 is set to the dialog mode, the electronic device 501 may use beamforming to obtain a sound from at least one specified direction by using a plurality of microphones 620a and 620b.

Figure 14:
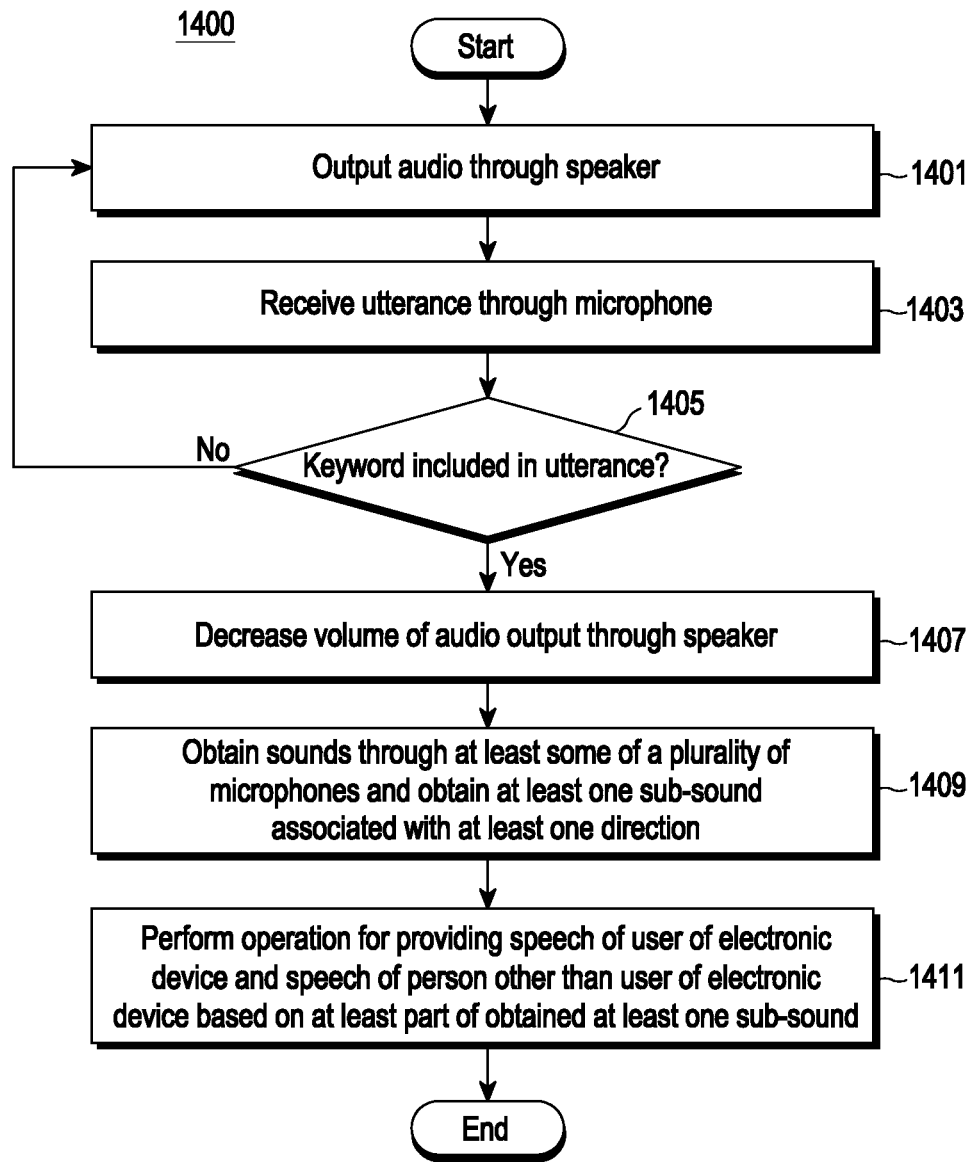
FIG. 14 is a flowchart illustrating an exemplary operation of a wearable device according to various embodiments.

FIG. 14 is a flowchart 1400 illustrating an exemplary operation of the electronic device 501 according to various embodiments. The operations illustrated in FIG. 14 may be performed in various orders, not limited to the illustrated order. According to various embodiments, more or fewer operations than the operations illustrated in FIG. 14 may be performed. FIG. 14 will be described with reference to FIGS. 15A, 15B, and 16.

Figure 15A:
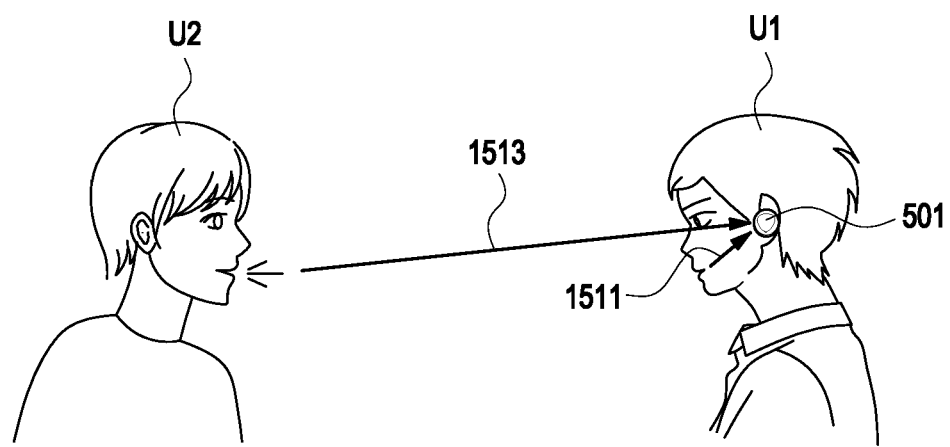
FIG. 15A is a diagram illustrating an exemplary operation of identifying whether a specified condition is satisfied by a wearable device according to various embodiments.
Figure 15B:
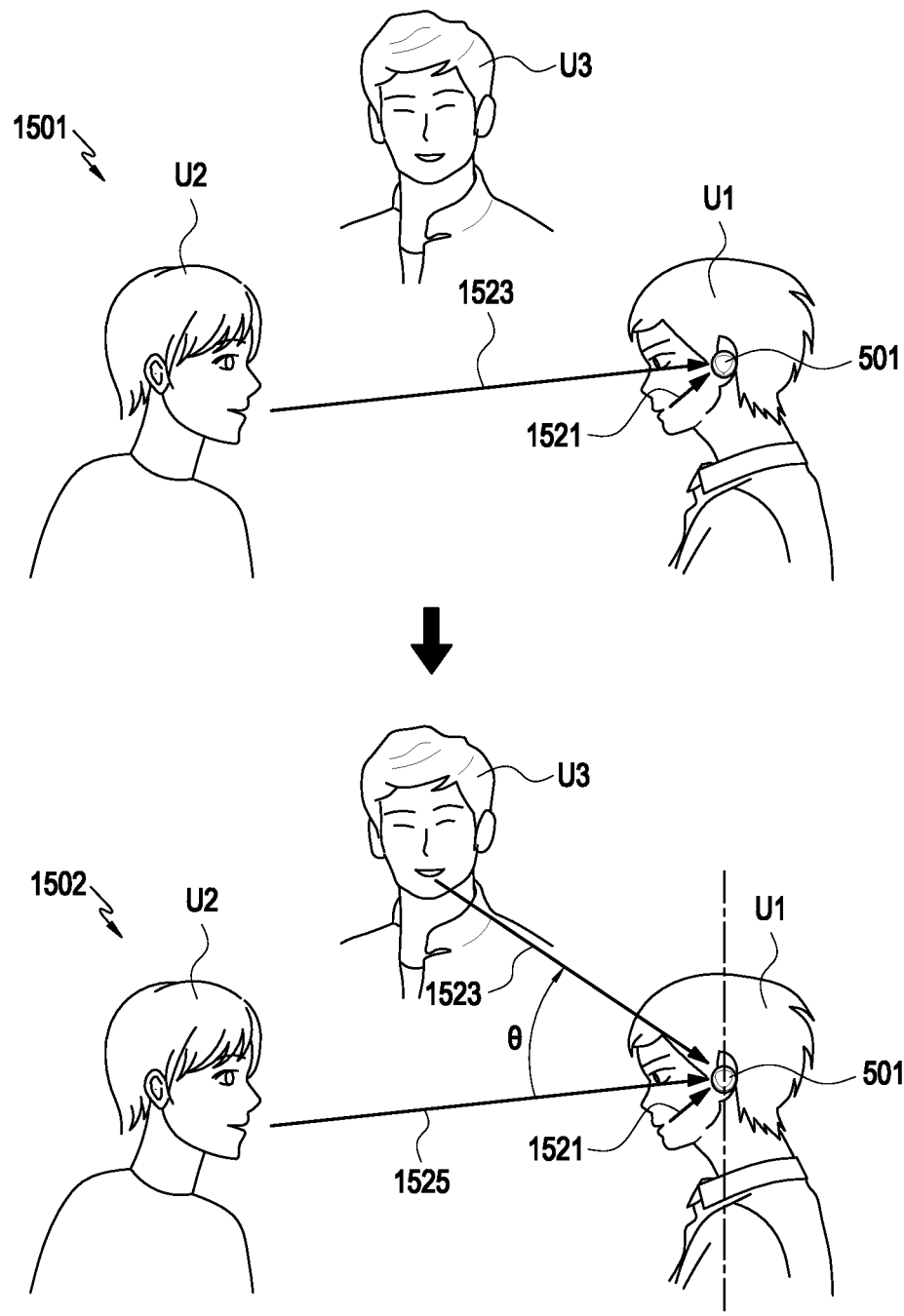
FIG. 15B is a diagram illustrating operations of modules included in a wearable device according to various embodiments.
Figure 16:
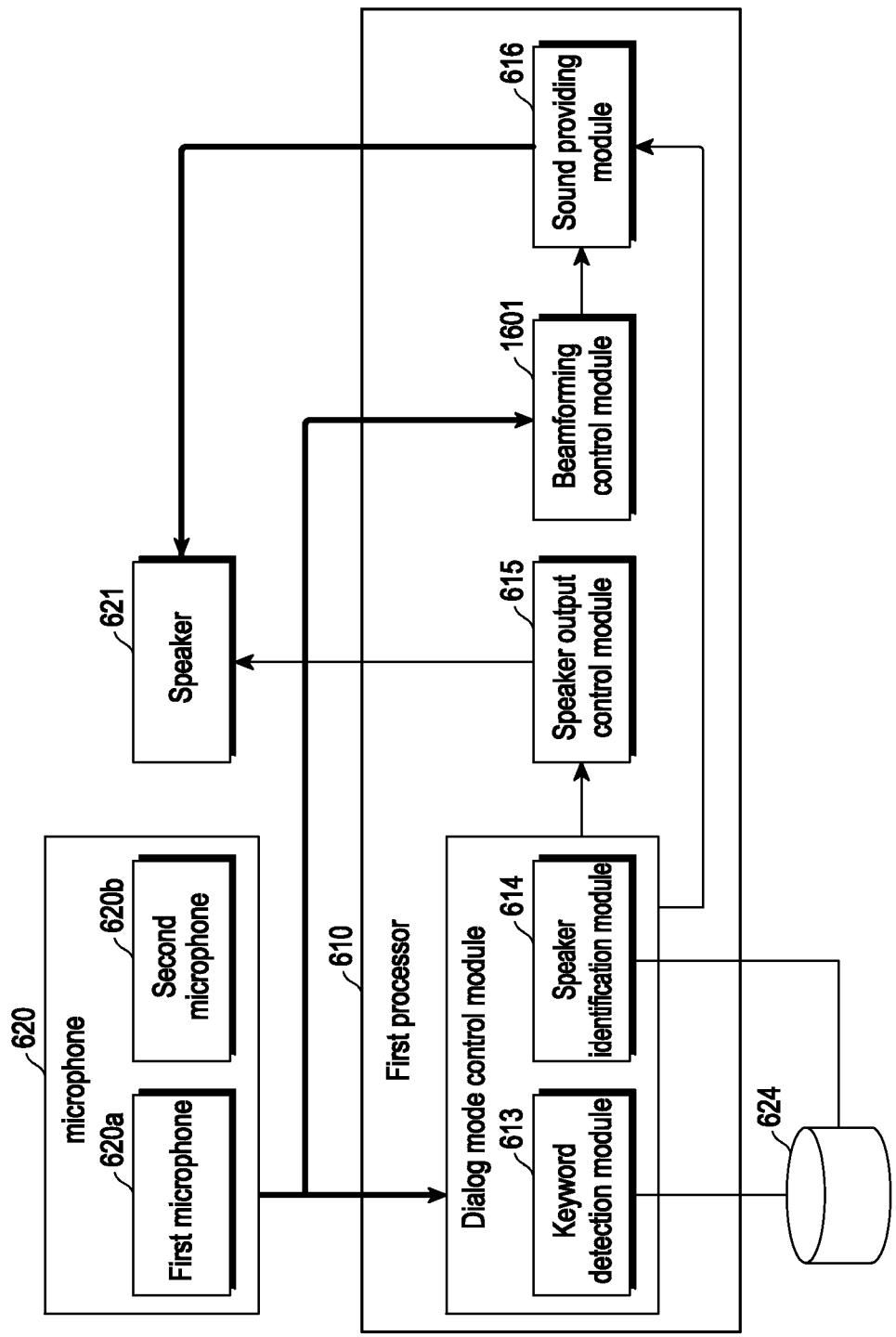
FIG. 16 is a diagram illustrating an exemplary operation of identifying an utterance of a user by a wearable device according to various embodiments.

FIG. 15A is a diagram illustrating an example of an operation of identifying whether a specified condition is satisfied by the electronic device 501 according to various embodiments. FIG. 15B is a diagram illustrating operations of modules included in the electronic device 501 according to various embodiments. FIG. 16 is a diagram illustrating an example of an operation of identifying an utterance of the user U1 of the electronic device 501 according to various embodiments.

According to various embodiments, the electronic device 501 may output audio through the speaker 621 in operation 1401. For example, the electronic device 501 (for example, the first processor 610) may output audio through the speaker 621 based on audio data or may generate anti-noise to cancel ambient noise (and/or background noise) and output the anti-noise through the speaker 621. Since operation 1401 of the electronic device 501 may be performed in the same manner as operation 701 of the electronic device 501 described above, duplicative descriptions thereof are omitted.

According to various embodiments, the electronic device 501 may identify (or receive) an utterance through microphone (for example, at least one of the plurality of microphones 620) in operation 1403 and identify whether a specified keyword is included in the utterance in operation 1405. For example, the electronic device 501 (for example, the keyword detection module 613) may identify whether a keyword is included in the utterance received through the microphones 620 based on keywords and/or speech information for the keywords, stored in the memory, as illustrated in FIG. 16. Further, for example, the electronic device 501 (for example, the speaker identification module 614) may identify whether a specified condition is satisfied by identifying whether an utterance received after the keyword detection is from the user U1, as illustrated in FIG. 16. When a keyword is detected and the specified condition is satisfied, the electronic device 501 (for example, the first processor 610) may set its mode to the dialog mode. Because operations 1403 and 1405 of the electronic device 501 may be performed in the same manner as operations 703 and 705, and operations 1103 and 1105 of the electronic device 501 described above, duplicative descriptions thereof are omitted.

According to various embodiments, based on the identification that a specified keyword is included in the utterance, the electronic device 501 may decrease the volume of audio output through the speaker 621 in operation 1407. For example, as illustrated in FIG. 16, the electronic device 501 (for example, the speaker output control module 615) may control the speaker 621 to reduce the volume of the audio output through the speaker 621 or stop output of the audio, and/or stop output of anti-noise.

According to various embodiments, the electronic device 501 may obtain ambient sound through at least one of the plurality of microphones 620a and 620b and at least one sub-sound associated with at least one direction based on the identification that the specified keyword is included in the utterance in operation 1409, and provide the utterance of the user U1 of the UE 503 and the utterance of another person other than the user U1 of the electronic device based on at least a part of the obtained at least one sub-sound in operation 1411. For example, the electronic device 501 (for example, the beamforming control module 1601) may obtain a sound from a specified direction based on the mode of the electronic device 501 being set to the dialog mode, as illustrated in FIG. 16. For example, the beamforming control module 1601 may receive ambient sound through each of the plurality of microphones 620a and 620b, calculate a time delay or phase delay associated with the at least one specified direction with respect to the electronic device 501, and obtain at least one sub-sound generated from the at least one specified direction by signal-processing (delaying and adding) the ambient sound received through each of the plurality of microphones 620a and 620b based on the calculated time delay or phase delay. Since the operation of the beamforming control module 1601 may be performed in the same manner as a well-known beamforming technique of the microphones 620, detailed description will be omitted. In an embodiment, the electronic device 501 may perform the operation of outputting the obtained sub-sound associated with the at least one direction described above through the speaker 621, thereby providing the speech of the user and the speech of another person talking with the user U1. The electronic device 501 may separate speeches from the obtained sub-sound, post-process the speeches (for example, synthesize the speeches, amplify the volume of the speeches, and increase the clarity of the speeches) and output the post-processed speeches through the speaker 621. In an embodiment, the electronic device 501 may obtain the speech of a selected speaker and output the obtained speech through the speaker 621 by using a speech model generated from the sub-sound associated with the at least one direction, which will be described in detail with reference to FIGS. 17, 18, 19, and 20. For example, examples of at least one direction in which a sub-sound is obtained by the electronic device 501 (for example, the beamforming control module 1601) will be described below.

According to various embodiments, the at least one specified direction may be preset. For example, the at least one specified direction is a direction 1511 from the electronic device 501 to the mouth of the user U1 and a forward direction 1513 of the user U1 from the electronic device 501 as illustrated in FIG. 15A. For example, the direction 1511 to the mouth of the user U1 wearing the electronic device 501 may be calculated based on a predetermined position of the worn electronic device 501 and the position of the mouth of the user U1 and may be preset. In an example, the forward direction 1513 of the user U1 wearing the electronic device 501 may also be calculated based on the position of the worn electronic device 501 and the position of the user U1 in the forward direction. Accordingly, the electronic device 501 may obtain the speech (or utterance) of the user U1 associated with the mouth direction 1511 and the speech (or utterance) of the other person U2 associated with the forward direction 1513. In addition, for example, the electronic device 501 (for example, the beamforming control module 1601) may further obtain a sound from another direction 1525 along with a sound associated with at least one direction (for example, 1521 or 1523) based on the identification of occurrence of a specified event during acquisition of the sound from the at least one specified direction. In an embodiment, the specified event may occur when the user U1 maintains a conversation with the other person U2 located in the specified direction (for example, the forward direction 1523) for a specified time or longer, and then turns his or her head in a different direction. For example, the electronic device 501 (e.g., the beamforming control module 1601) may obtain a sub-sound from the mouth direction 1521 and a sub-sound from the forward direction of the user U1 based on sounds received through the plurality of microphones 620a and 620b, as indicated by reference numeral 1501 in FIG. 15B, while the position and/or direction of the head of the user U1 is maintained for a specified time or longer. As described above, the electronic device 501 (for example, the beamforming control module 1601) may determine whether the position and/or direction of the head of the user U1 has been maintained for the specified time or longer based on a value sensed from the sensor 623. For example, when the electronic device 501 (for example, the first processor 610) has maintained (or does not have) a value sensed from the sensor 623 (for example, the acceleration sensor), the electronic device 501 may determine that the position and/or direction of the head of the user U1 has been maintained. As indicated by reference numeral 1502 in FIG. 15B, when identifying that the position and/or direction of the head of the user U1 has been maintained for the specified time or longer and then the position of the head has been changed, the electronic device 501 (for example, the first processor 610) may determine that the specified event has occurred. The electronic device 501 (for example, the beamforming control module 1601) may calculate an angle Θ at which the head has been rotated based on the value identified by the sensor 623 based on the occurrence of the event and calculate the other direction 1525 based on the calculated angle Θ and the forward direction 1523 of the user U1, to obtain the sub-sound associated with the other direction based on sounds received through the plurality of microphones 620a and 620b. Herein, the electronic device 501 (for example, the beamforming control module 1601) may obtain a sub-sound associated with a preset direction (for example, the mouth direction 1521 and the forward direction 1523) while obtaining the sub-sound associated with the other direction 1525. Accordingly, the electronic device 501 may obtain the speech (or utterances) of the user U1 associated with the mouth direction 1521 and the speeches (or utterances) of other persons U2 and U2 associated with the forward direction and other direction 1523 and 1525, who are talking with the user U1.

In addition, according to various embodiments, the at least one specified direction may be set as a direction of a specific speaker identified based on capturing by the camera of the electronic device 501 (or the UE 503). For example, the electronic device 501 may capture the surroundings of the user U1 using the camera provided in the electronic device 501 or the UE 503 and identify the speaker by the captured image. When the electronic device 501 analyzes the image of the identified speaker (for example, by analyzing the shape of the mouth) and determines that the speaker is one communicating with the user U1, the electronic device 501 may analyze the direction of the corresponding speaker (for example, in a two-dimensional (2D) coordinate system) to obtain a sub-sound from the identified direction.

Now, another exemplary operation of the electronic device 501 according to various embodiments will be described. The exemplary operation of the electronic device 501 described above may be applied to another exemplary operation of the electronic device 501 described below.

According to various embodiments, when the mode of the electronic device 501 is set to the dialog mode, the electronic device 501 may perform an operation of providing a speech of the user U1 and a speech of another speaker based on a speech model for the user U1 and a speech model for the other speaker. Therefore, the user U1 wearing the electronic device 501 may more clearly receive the speech of the speaker other than the user U1.

Figure 17:
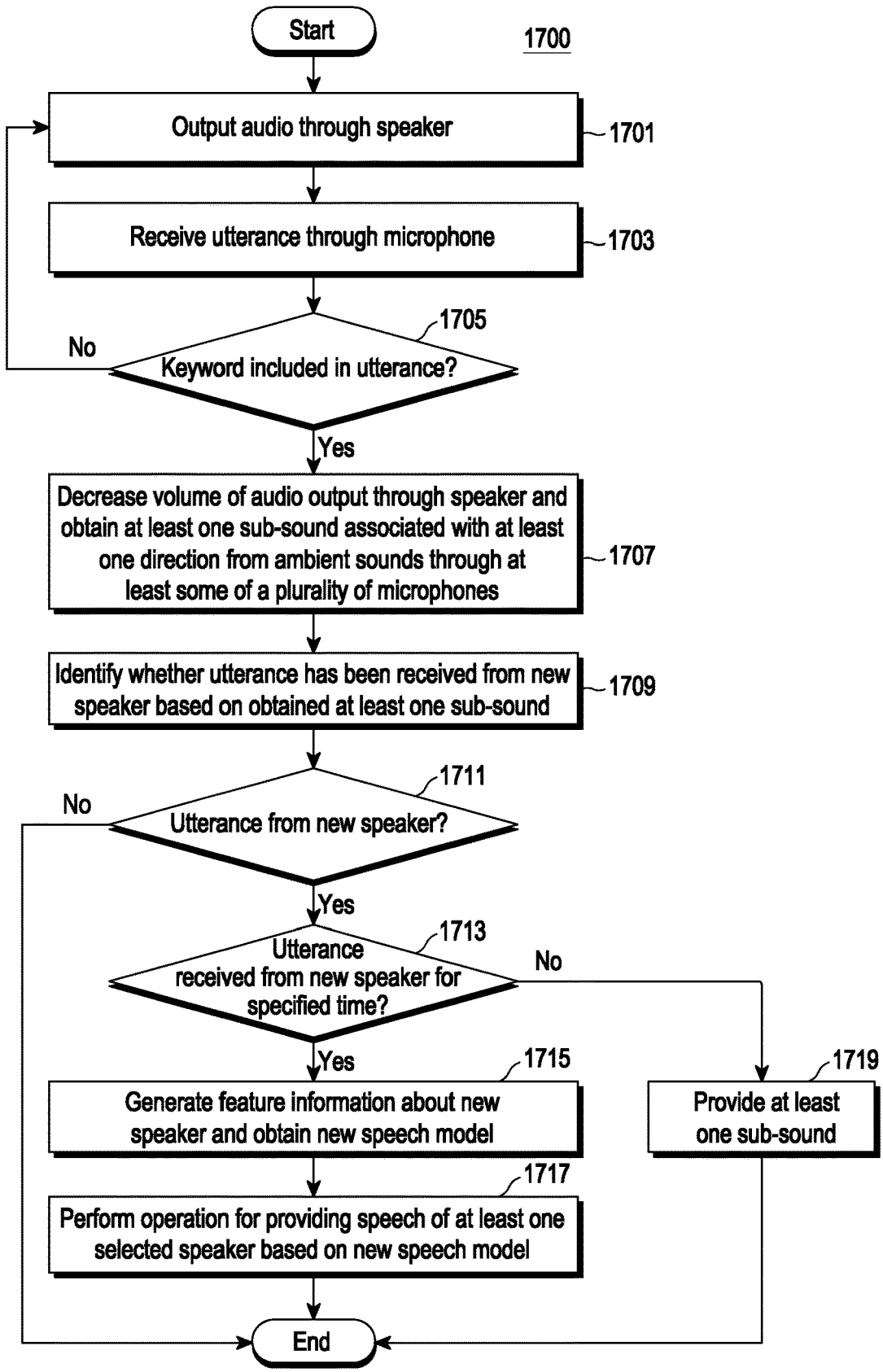
FIG. 17 is a flowchart illustrating an exemplary operation of a wearable device according to various embodiments.

FIG. 17 is a flowchart 1700 illustrating an exemplary operation of the electronic device 501 according to various embodiments. The operations illustrated in FIG. 17 may be performed in various orders, not limited to the illustrated order. According to various embodiments, more or fewer operations than the operations illustrated in FIG. 17 may be performed. FIG. 14 will be described with reference to FIGS. 18A, 18B, 19A, 19B, and 20.

Figure 18A:
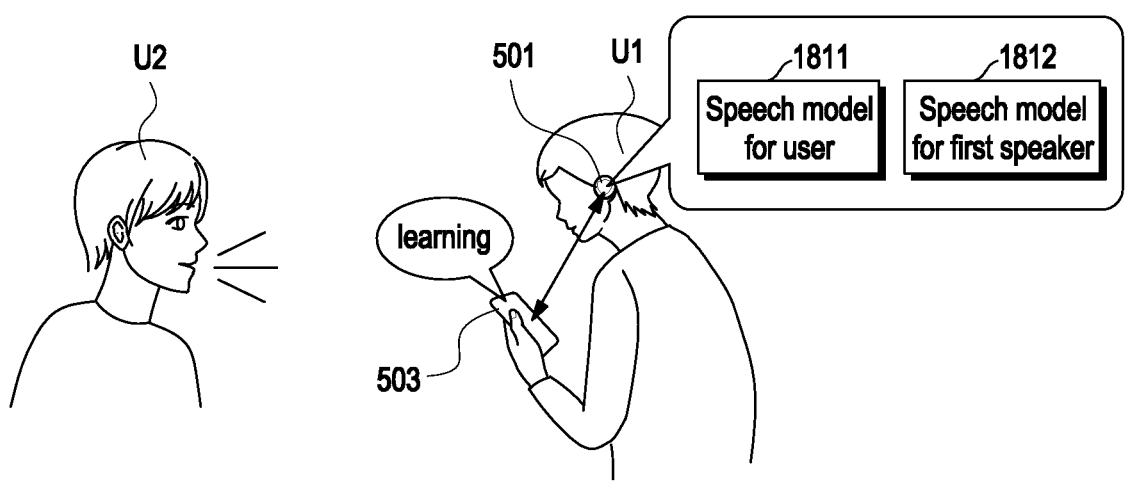
FIG. 18A is a diagram illustrating an exemplary operation of generating a speech model by a wearable device according to various embodiments.
Figure 18B:
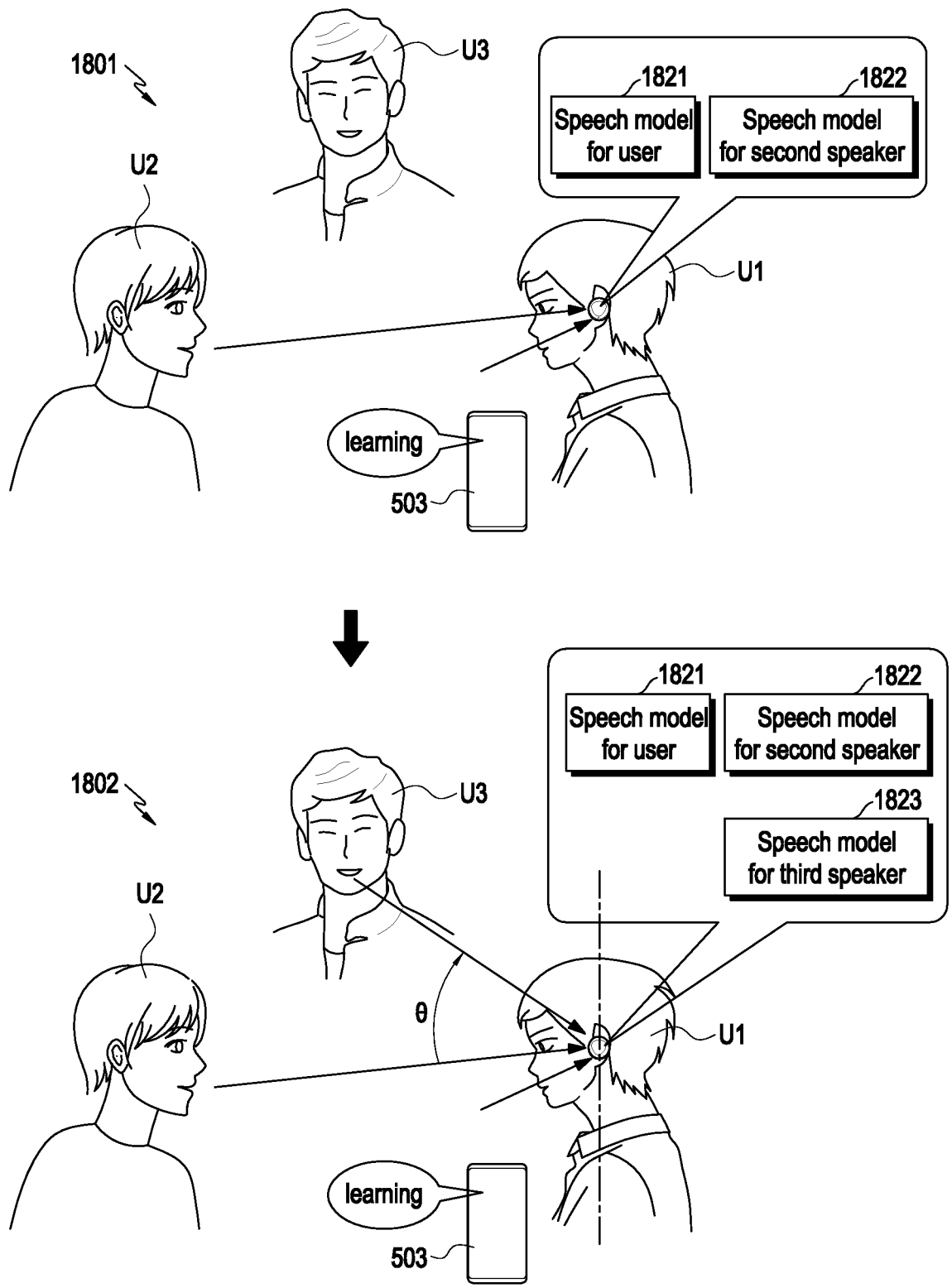
FIG. 18B is a diagram illustrating another exemplary operation of generating a speech model by a wearable device according to various embodiments.
Figure 19A:
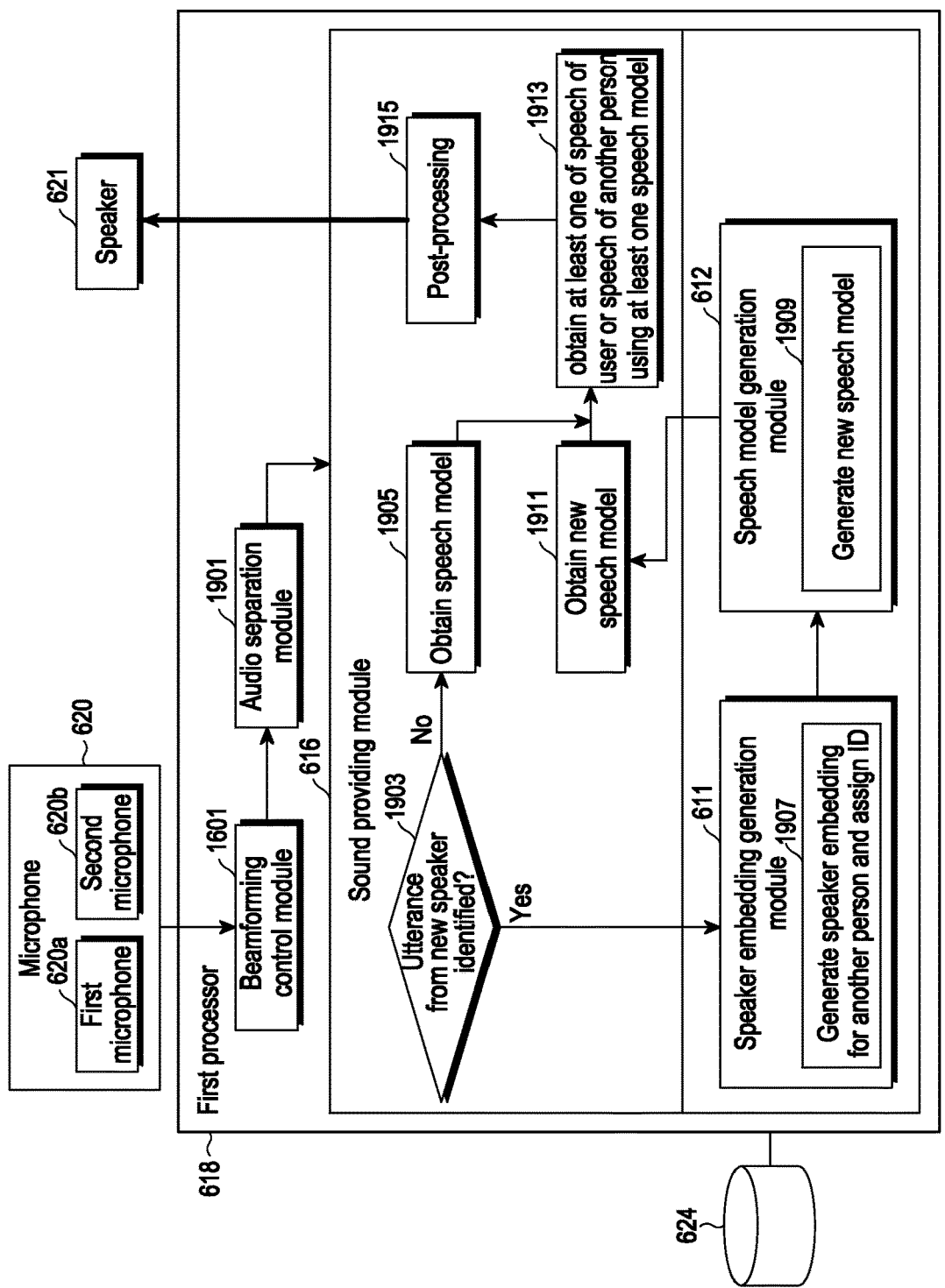
FIG. 19A is a diagram illustrating an exemplary operation of generating a speech model and an exemplary operation of providing speeches of speakers selected based on the speech model by a wearable device according to various embodiments.
Figure 19B:
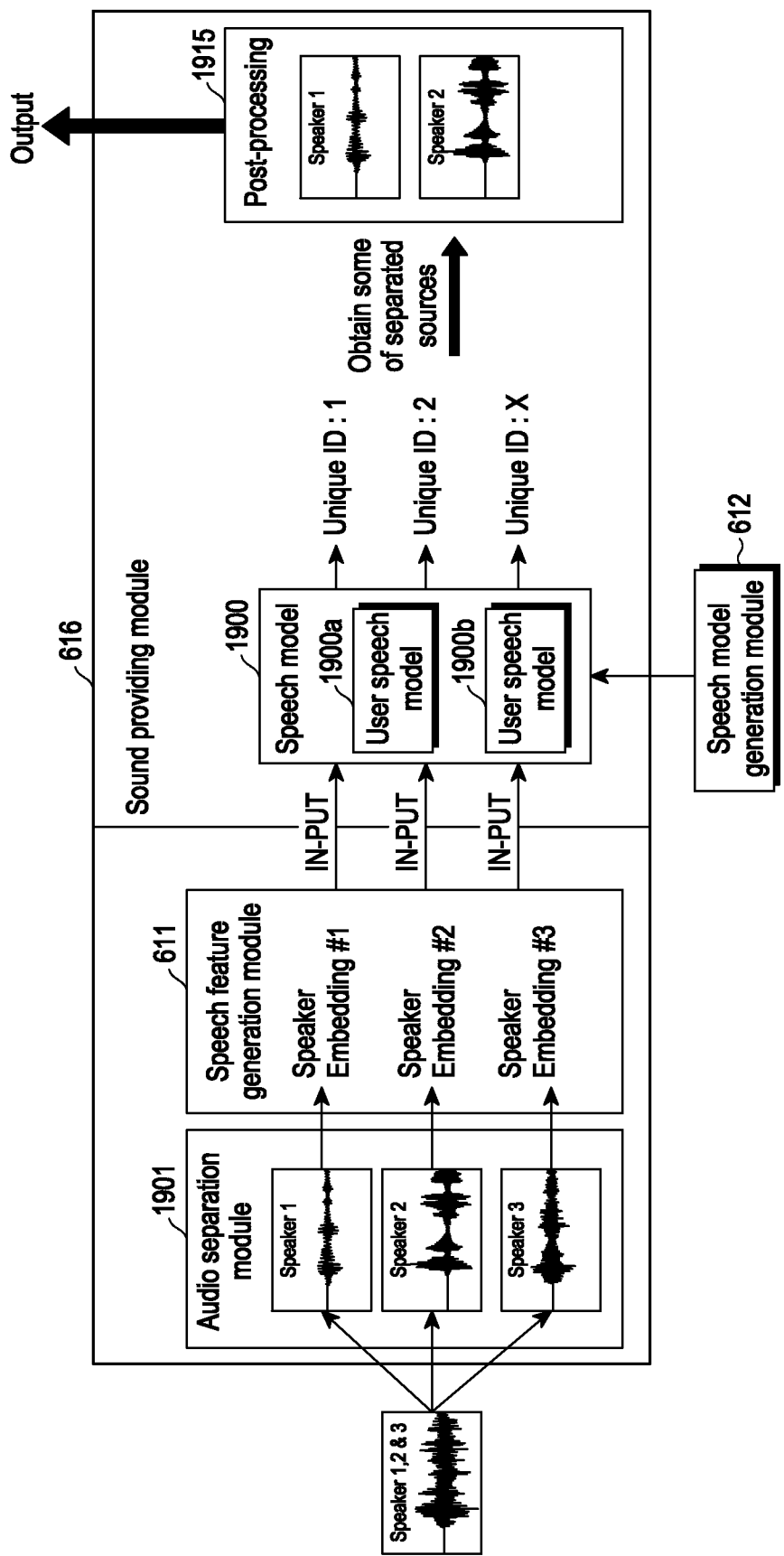
FIG. 19B is a diagram illustrating an exemplary operation of providing speeches of speakers selected based on a speech model by a wearable device according to various embodiments.
Figure 20:
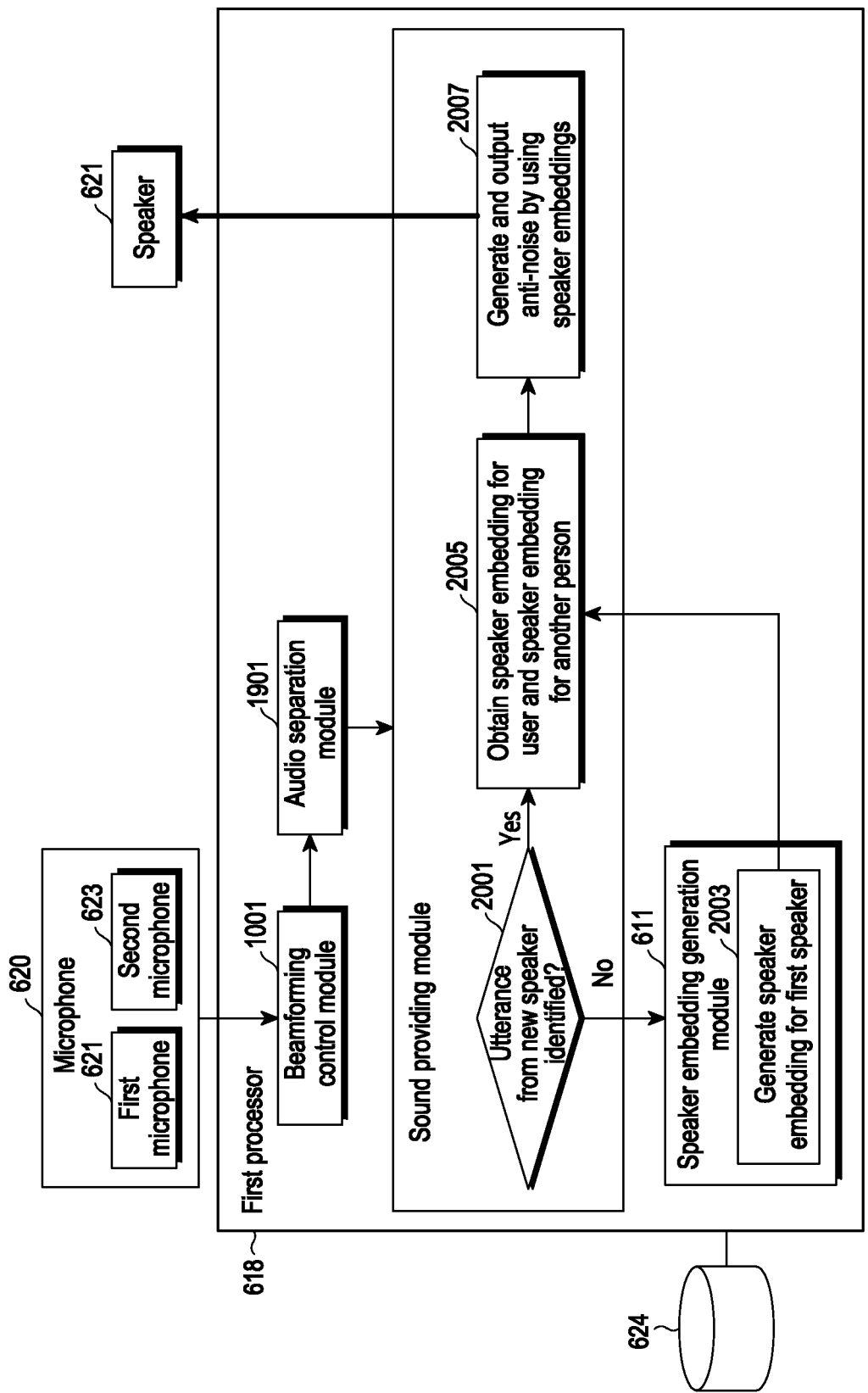
FIG. 20 is a diagram illustrating an exemplary operation of providing speeches of selected speakers by a wearable device according to various embodiments.

FIG. 18A is a diagram illustrating an exemplary operation of generating a speech model by the electronic device 501 according to various embodiments. FIG. 18B is a diagram illustrating another exemplary operation of generating a speech model by the electronic device 501 according to various embodiments. FIG. 19A is a diagram illustrating an exemplary operation of generating a speech model by the electronic device 501 and an exemplary operation of providing speeches of speakers selected based on the speech model by the electronic device 501 according to various embodiments. FIG. 19B is a diagram illustrating an exemplary operation of providing speeches of selected speakers based on a speech model by the electronic device 501 according to various embodiments. FIG. 20 is a diagram illustrating an exemplary operation of providing speeches of selected speakers by the electronic device 501 according to various embodiments.

According to various embodiments, the electronic device 501 may output audio through the speaker 621 in operation 1701. For example, the electronic device 501 (for example, the first processor 610) may output audio through the speaker 621 based on audio data or may generate and output anti-noise to cancel ambient noise (and/or background noise). Since operation 1701 of the electronic device 501 may be performed in the same manner as operation 701 of the electronic device 501 described before, duplicative descriptions thereof are omitted.

According to various embodiments, the electronic device 501 may identify (or receive) an utterance through microphone (for example, at least one of the plurality of microphones 620a and 620b) in operation 1703 and identify whether a specified keyword is included in the utterance in operation 1705. For example, the electronic device 501 (for example, the keyword detection module 613) may identify whether the specified keyword is included in the utterance received through the microphones 620 based on keywords and/or speech information for the keywords that are stored in the memory. For example, the electronic device 501 (for example, the speaker identification module 614) may identify whether an utterance received after the keyword detection is from the user U1 to identify whether a specified condition is satisfied. When the keyword is detected and the specified condition is satisfied, the electronic device 501 (for example, the first processor 610) may set its mode to the dialog mode. Since operations 1703 and 1705 of the electronic device 501 may be performed in the same manner as operations 703 and 705 of the electronic device 501 described above, duplicative descriptions thereof are omitted.

According to various embodiments, based on the identification that the specified keyword is included in the utterance, the electronic device 501 may reduce the volume of audio output through the speaker 621 and obtain at least one sub-sound associated with at least one direction from ambient sounds received through at least one of the plurality of microphones 620a and 620b in operation 1707. For example, the electronic device 501 (for example, the speaker output control module 615) may reduce the volume of audio output through the speaker 621, stop the output of the audio, and/or stop the output of anti-noise based on the mode of the electronic device 501 being set to the dialog mode. Further, for example, the electronic device 501 (for example, the beamforming control module 1601) may obtain a sub-sound related to at least one specified direction from sounds received through the plurality of microphones 620a and 620b, based on the mode of the electronic device 501 being set to the dialog mode, as illustrated in FIG. 19A. In an embodiment, the at least one direction may include the preset mouth direction of the user U1 and forward direction of the user U1 as illustrated in FIG. 18A. In an embodiment, the at least one specified direction may include the preset mouth direction of the user U1, forward direction of the user U1, and other direction when the user U1 turns his or her head, as illustrated in FIG. 18B.

According to various embodiments, the electronic device 501 may identify whether an utterance has been received from a new speaker, based on the obtained at least one sub-sound in operation 1709. For example, the electronic device 501 may separate at least one speech associated with at least one speaker from the obtained sub-sound associated with the at least one direction, and identify whether there is an utterance from a new other person in the separated at least one speech by using pre-stored feature information (for example, a speaker embedding) and a pre-stored speech model. Hereinbelow, an example of the operation of separating a speech from a sub-sound and the operation of determining whether there is an utterance from a new other person in the separated speech by the electronic device 501 will be described.

According to various embodiments, the electronic device 501 (for example, an audio separation module 1901) may obtain at least one speech associated with at least one speaker by separating the at least one speech from an obtained sub-sound. Not limited to the above description, the electronic device 501 (for example, the audio separation module 1901) may also separate the obtained sub-sound into the at least one speech and other noises after separating an obtained sub-sound. For example, the audio separation module 1901 may analyze the components of the sub-sound in the time domain based on a principal component analysis algorithm (or circuit) and/or an independent component analysis algorithm (or circuit), and/or in the frequency domain (for example, by FFT-processing the sub-sound), to separate speeches from the sub-sound based on the analysis result. The separated speeches may have independent features statistically. Further, for example, the audio separation module 1901 may separate the speech from the sub-sound by using an AI model (for example, a deep learning model or a machine learning model) realized to separate speech from sound. In addition, the operation of separating speech by the audio separation module 1901 may be performed by a general source separation technique, which will not be described in detail herein. In an embodiment, the electronic device 501 (for example, the audio separation module 1901) may obtain sub-sounds associated with the mouth direction and forward direction of the user U1 by using at least one of the plurality of microphones 620a and 620b and obtain the speech of the user U1 and the speech of another person talking with the user U1 from the obtained sub-sounds, as illustrated in FIG. 18A. Further, in an embodiment, the electronic device 501 (for example, the audio separation module 1901) may obtain sub-sounds associated with the mouth direction, forward direction, and another direction of the user U1 by using at least one of the plurality of microphones 620a and 620b and obtain the speech of the user U1 and the speeches of other persons talking with the user U1 from the obtained sub-sounds, as illustrated in FIG. 18B. The electronic device 501 may obtain speeches of other speakers around the user U1 and other persons talking with the user U1. Not limited to the description and/or the illustration, the electronic device 501 may perform the operation of separating speeches from sounds received through at least one of the plurality of microphones 620a and 620b without performing the operation of obtaining a sub-sound associated with at least one direction (or without the operation of the beamforming control module).

In an embodiment, the electronic device 501 (for example, the audio separation module 1901) may determine whether there is a speech (or utterance) of a new speaker (or a new other person) among the separated speeches (or whether an utterance has been received from a new speaker). As illustrated in FIG. 19A, the electronic device 501 (for example, the sound providing module 616) may determine whether there is a speech of a new speaker (or whether there is a speech of an existing speaker) among the separated speeches, based on the separated speeches and a speaker embedding (for example, the speaker embedding of the user U1) pre-stored in the electronic device 501 in operation 903. The electronic device 501 (for example, the sound providing module 616) may generate a speaker embedding corresponding to each of the separated speeches by using the speech feature generation module 611 and compared the generated speaker embedding with pre-stored speaker embeddings. When identifying a specific speaker embedding that does not match any of the pre-stored speaker embeddings (or a specific speaker embedding with a similarity less than a preset value) among the generated embeddings based on the comparison result, the electronic device 501 (for example, the sound providing module 616) may determine that a speech of a new speaker has been detected and identify a speech corresponding to the specific speaker embedding among the separated at least one speech as the speech of the new speaker. For example, the electronic device 501 (for example, the sound providing module 616) may determine whether there is an utterance of a new speaker among the separated speeches, based on a speech model pre-stored in the electronic device 501. The electronic device 501 (for example, the sound providing module 616) may generate at least one speaker embedding corresponding to the separated at least one speech and input the generated at least one speaker embedding to the pre-stored speech model to obtain at least one ID for at least one speaker, output from the speech model. When the electronic device 501 fails to receive (or obtain) the ID of a speaker from the speech model in response to the input of the specific speaker embedding among the at least one speaker embedding, the electronic device 501 may determine that there is a speech of a new speaker and identify a speech corresponding to the specific speaker embedding among the separated at least one speech as the speech of the new speaker. When determining that there is a speech of a new speaker, the electronic device 501 may continuously obtain the speech corresponding to the identified specific speaker embedding and assign a new ID to the specific speaker embedding and/or speech.

According to various embodiments, when the electronic device 501 identifies that there is no utterance of a new speaker (or another person) (or identifies that the received utterance is an utterance of a pre-stored speaker), the electronic device 501 may obtain a speech model (or speaker embedding) for the pre-stored speaker in operation 1905 and obtain a speech corresponding to a selected speaker (for example, the user or an existing speaker) from the separated speeches by using the pre-stored speech model (or speaker embedding) in operation 1913. In operation 1915, the speech may be output through the speaker 621 after post-processing (for example, synthesis and volume increase) in operation 1915. The operation of identifying a user and a speaker by using a speech model will be described below. The operation of identifying a speaker using a pre-stored speaker embedding is performed as described above, and thus its detailed description will be omitted herein.

According to various embodiments, when identifying that there is an utterance of a new speaker in operation 1711, the electronic device 501 may determine whether the speech has been received from the new speaker for a specified time or longer in operation 1713. For example, the electronic device 501 may compare feature information (for example, a speaker embedding or general speech feature information other than the speaker embedding) about the speech of the new speaker with feature information (for example, a speaker embedding or general speech feature information other than the speaker embedding) about a part of at least one speech obtained by using the audio separation module 1901 and identify whether a speech having features corresponding to the feature information about the identified speech of the new speaker has been obtained for a specified time or longer based on the comparison result. The electronic device may perform the operation of continuously obtaining the speech of the new speaker for the specified time, generating a speaker embedding for the new speaker, and generating a new speech model based on the generated speaker embedding. Not limited to the description and/or the illustration, the electronic device 501 may generate speaker embeddings for at least two new speakers as well as a single new speaker and generate a new speech mode.

According to various embodiments, when the speech of the new speaker has been obtained for the specified time or longer, the electronic device 501 may generate feature information about the new speaker and obtain a new speech model based on the feature information in operation 1715, and provide the speech of at least one speaker selected based on the new speech model in operation 1717. For example, the electronic device 501 (for example, the first processor 610) may generate a speaker embedding for the new speaker based on the speech of the new speaker obtained for the specified time or longer, and assign an ID (for example, a unique ID) to the new speaker in operation 1907. The electronic device 501 may perform training by adding the generated speaker embedding and the ID of the new speaker as training data to the existing speech mode to generate a new speech model in operation 1909 and obtain the new speech mode in operation 1911. As illustrated in FIG. 19B, a new speech model 1900 may be configured to output the ID of the new speaker as well as the IDs of pre-stored speakers in response to input of the speaker embedding of the new speaker as well as the speaker embeddings of the pre-stored speakers. For example, as illustrated in FIG. 18A, the electronic device 501 may obtain a speech of a first speaker U2 (or another person) talking with the user U1 for the specified time or longer, and generate a new speech model (for example, a speech model including a speech model 1811 of the user and a speech model 1812 of the first speaker) based on the speech of the first speaker U2 (or another person). Further, for example, the electronic device 501 may generate a new speech model based on the speech of the first speaker U2 as indicated by reference numeral 1801 in FIG. 18B, and then obtain a speech of a second user U3 speaking in front of the user U1 who has turned the head, as indicated by reference numeral 1802 in FIG. 18B. Thus, the electronic device 501 may generate a speech model including a new speech model (for example, the speech model 1900 in FIG. 19A) (for example, a speech model including a speech mode 1821 of the user, a speech model 1822 of the first user, and a speech model 1823 of the second user). The electronic device 501 may generate a speech model separately for each individual speaker (for example, the user U1, the first user U2, and the second user U3) instead of the integrated speech mode, not limited to the above description. The operation of providing speeches of a user and at least one selected speaker based on the generated speech model 1900 by the electronic device 501 will be further described below.

According to various embodiments, the electronic device 501 may output the speech of at least one selected speaker among a plurality of speeches (for example, speeches separated by the audio separation module 1901) through the speaker 621 by using a new generated speech model, as illustrated. In other words, the electronic device 501 may obtain (or filter) the speech of the selected speaker among the currently obtained speeches by using the new speech model 1900 in operation 1913 to provide the speech to the user U1 (for example, through the speaker 621) in FIG. 19A. For example, the electronic device 501 may obtain a plurality of separated speeches from sounds received through the microphones 620 by using the audio separation module 1901 after a specified time (or after the new speech model 1900 is generated), as illustrated in FIG. 19B. For example, the obtained plurality of speeches may include a first speech of the user U1 (speaker 1), a second speech of speaker 2 talking with the user U1, and a third speech of speaker 3 with no relation to the speaker talking with the user U1, as illustrated in FIG. 19B. The electronic device 501 may generate speaker embeddings (for example, a first speaker embedding for the user U1, a second speaker embedding for the speaker, and a third speaker embedding for any other person) corresponding to the at least one speech obtained by using the speech feature generation module 611. The electronic device 501 (for example, the sound providing module 616) may input the generated speaker embeddings to the new speech model 1900 and thus obtain IDs corresponding to the speaker embeddings output from the speech model (for example, a unique ID of "1" and a unique ID of "2"). The electronic device 501 (for example, the sound providing module 616) may identify at least one speaker embedding (for example, the first and second speaker embeddings) having an ID (for example, the unique ID of "1" and the unique ID of "2") corresponding to a selected speaker among the plurality of speaker embeddings (for example, the first, second, and third speaker embeddings) based on the acquisition of the IDs (for example, the unique ID of "1" and the unique ID of "2") corresponding to the respective speaker embeddings, and identify at least one speech (for example, the first speech of the user U1 (speaker 1) and the second speech of the speaker (speaker 2) talking with the user U1) corresponding to the identified at least one speaker embedding among the plurality of speeches (for example, the first, second, and third speeches). The unique ID of "1" is the ID of the user, output from a user speech model 1900a of the speech model 1900, and the unique ID of "2" is the ID of the speaker talking with the user, output from a user speech model 1900b of the speech model 1900. The electronic device 501 (for example, the sound providing module 616) may post-process the identified at least one speech (for example, the first and second speeches) and output the at least one post-processed speech through the speaker 621. Alternatively, the sound providing module 616 may exclude the third speech of speaker 3 corresponding to a specific speaker embedding (for example, the third speaker embedding) from the plurality of speeches and thus obtain the remaining speeches (for example, the first speech of the user U1 (speaker 1) and the second speech of the speaker (speaker 2) talking with the user U1) based on identification that an ID is not output in response to the input of the specific speaker embedding (for example, the third speaker embedding). The post-processing operation 1915 may include at least one of speech synthesis, increasing the clarity of a speech (for example, enhancing the speech through a harmonic emphasis filter), or increasing the volume of the speech.

According to various embodiments, the selected speaker may be preset or may be set by the user U1. The electronic device 501 may identify the ID of the speaker preset or set by the user U1 and provide a speech having a speaker embedding having an ID matching the identified ID, as described before. In an embodiment, the user U1 and another person talking with the user U1 may be preset as the speakers. In this case, the electronic device 501 may identify the first ID of the user U1 and provide an utterance including a registered keyword, or may identify the second ID of another person speaking an utterance among speeches of the user U1 and obtain speeches with speaker embeddings having IDs matching the first and second IDs identified from among a plurality of obtained speeches (for example, speeches separated by the sound separation module). In an embodiment, the speaker may be selected by the user U1. For example, the UE 503 may provide information about speakers corresponding to a plurality of stored IDs, and receive a selection of a specific speaker based on the provision of the information. The information may include additional information about a specific speaker (for example, a dialog time (or a time when the ID is obtained), an image, and an utterance) which is obtained when the ID of the specific speaker is obtained, and the user U1 may recognize speakers by checking the additional information. The electronic device 501 may receive information about a speaker selected by the user from the UE 503 and identify (and/or obtain) an ID corresponding to the selected speaker. Further, for example, when the electronic device 501 detects a specified gesture (touch or tap on the electronic device 501) by the sensor 623, the electronic device 501 may select a speaker corresponding a speech received through the microphones 620 at the time when the gesture is detected, and identify (and/or obtain) the ID of the speaker.

According to various embodiments, not limited to the above description, the electronic device 501 may output anti-noise for canceling an ambient sound other than the speech corresponding to the selected speaker through the speaker 621. For example, as illustrated in FIG. 20, when an utterance of a new speaker (for example, the first speaker) is identified in operation 2001, the electronic device 501 (for example, the sound providing module 616) may generate a speaker embedding for the new first speaker in operation 2003. Thus, the electronic device 501 (for example, the sound providing module 616) may obtain the speaker embedding of the user U1 and the speaker embedding of the new speaker in operation 2005 and generate and output anti-noise based on the obtained speaker embeddings in operation 2007. For example, the electronic device 501 (for example, the sound providing module 616) may obtain the remaining sounds other than the speeches of the user U1 and the new speaker (for example, U2) from sounds received through the microphones 620, based on the obtained speaker embeddings. The electronic device 501 may generate anti-noise to cancel the obtained remaining sounds and output the anti-noise through the speaker 621. Accordingly, the speech of the user U1 and the speech of the speaker U2 may be provided to the user U1.

According to various embodiments, when the dialog mode of the electronic device 501 ends, the electronic device 501 may remove (or delete) the stored speech, speaker embedding, or speech model of another person, embedding a speaker for the other person in the electronic device 501, which should not be construed as limiting.

According to various embodiments, when the speech of the new speaker (or another person) has been obtained for a shorter time than the specified time, the electronic device 501 may output the obtained at least one sub-sound through the speaker 621 in operation 1719. In this case, as illustrated in FIG. 19A, the electronic device 501 may separate speeches from the at least one sub-sound, post-process the separated speeches, and output the post-processed speeches through the speaker 621.

According to various embodiments, an electronic device (for example, the electronic device 501 in FIG. 5) may include a communication circuit (for example, the first communication circuit 622 in FIG. 6A), a plurality of microphones (for example, the microphones 620a and 620b in FIG. 16), a speaker (for example, the speaker 621 in FIG. 6A), and at least one processor (for example, the first processor 610 in FIG. 6A). The at least one processor (for example, the first processor 610 in FIG. 6A) may be configured to output audio through the speaker (for example, the speaker 621 in FIG. 6A) based on data received from an external device (for example, the UE 502 in FIG. 6A) through the communication circuit (for example, the first communication circuit 622 in FIG. 6A), identify an utterance including a specified keyword, received through at least one of the plurality of microphones (for example, the microphones 620a and 620b in FIG. 16), decrease the volume of the audio output through the speaker (for example, the speaker 621 in FIG. 6A) based on identifying the utterance including the specified keyword, and preform an operation for providing a speech of a user of the electronic device (for example, the electronic device 501 in FIG. 5) and a speech of a person other than the user of the electronic device (for example, the electronic device 501 in FIG. 5) based on at least part of ambient sounds received through at least one of the plurality of microphones (for example, the microphones 620a and 620b in FIG. 16).

According to various embodiments, the electronic device (for example, the electronic device 501 in FIG. 5) may further include a memory (for example, the first memory 624 in FIG. 6A). The at least one processor may be configured to store a plurality of keywords from the external electronic device (for example, the UE 503 in FIG. 6A) or sounds corresponding to the plurality of keywords in the memory (for example, the first memory 624 in FIG. 6A), receive the utterance through the microphone during the output of the audio, and identify whether the utterance includes the specified keyword based on at least one of the plurality of keywords or the sounds corresponding to the plurality of keywords, and the received utterance.

According to various embodiments, the plurality of keywords may include at least one first keyword and at least one second keyword, the at least one first keyword may be a name of a user, and the at least one second keyword may be generated based on the at least one first keyword.

According to various embodiments, the at least one processor (for example, the first processor 610 in FIG. 6A) may be configured to identify whether the utterance has been spoken by the user based on identifying the utterance including the specified keyword, decrease the volume of the audio output through the speaker (for example, the speaker 621 in FIG. 6A), and perform the operation for providing the speech of the user of the electronic device (for example, the electronic device 501 in FIG. 5) and the speech of the other person, based on identifying that the utterance has been spoken by the user.

According to various embodiments, the electronic device (for example, the electronic device 501 in FIG. 5) may further include a sensor. The at least one processor (for example, the first processor 610 in FIG. 6A) may be configured to identify at least one specified value by using the sensor based on identifying the utterance including the specified keyword, the at least one specified value indicating that the utterance has been spoken by the user, and identify that the utterance has been spoken by the user, based on identifying the at least one specified value.

According to various embodiments, the at least one processor (for example, the first processor 610 in FIG. 6A) may be configured to generate first feature information about at least one speech of the user, before identifying the utterance including the specified keyword, compare feature information about the utterance received through the microphone with the first feature information, based on identifying the utterance including the specified keyword, and identify that the utterance has been spoken by the user based on a result of the comparison.

According to various embodiments, the at least one processor (for example, the first processor 610 in FIG. 6A) may be configured to obtain the ambient sounds through at least one of the plurality of microphones, based on identifying the utterance including the specified keyword, and obtain at least one sub-sound associated with at least one specified direction based on the obtained ambient sounds.

According to various embodiments, the at least one specified direction may be preset as a direction from the electronic device (for example, the electronic device 501 in FIG. 5) to the mouth of the user and a forward direction of the user from the electronic device (for example, the electronic device 501 in FIG. 5).

According to various embodiments, the at least one processor (for example, the first processor 610 in FIG. 6A) may be configured to receive the speech of the other person through at least one of the plurality of microphones (the microphones 620a and 620b in FIG. 16), based on identifying the utterance including the specified keyword, generate a speaker embedding for the other person based on the speech of the other person received for the specified time period when the speech of the other person has been received for a specified time period, obtain at least one speech model based on the speaker embedding for the other person and a speaker embedding for the user as training data, and obtain the speech of the user and the speech of the other person based on the obtained at least one speech model, and output the speeches.

According to various embodiments, the electronic device (for example, the electronic device 501 in FIG. 5) may further include a memory (for example, the first memory 624 in FIG. 6A). The at least one processor (for example, the first processor 610 in FIG. 6A) may be configured to compare at least one speaker embedding for at least one person pre-stored in the memory with the speaker embedding for the other person, and when the other person is identified as different from the at least one person based on a result of the comparison, obtain the at least one speech model.

According to various embodiments, the at least one processor (for example, the first processor 610 in FIG. 6A) may be configured to generate the at least one speech model by performing training by using the speaker embedding for the user and the speaker embedding for the other person as input data, and using a first identifier corresponding to the user and a second identifier corresponding to the other person as output data. The at least one speech model may be configured to output the first ID or the second identifier in response to input of the speaker embedding for the user or the speaker embedding for the other person.

According to various embodiments, the at least one processor (for example, the first processor 610 in FIG. 6A) may be configured to receive the ambient sounds through at least one of the plurality of microphones after the at least one speech model is generated, separate a plurality of speeches from the received sounds, the plurality of speeches corresponding to a plurality of persons, generate speaker embeddings for the plurality of persons based on the plurality of speeches, obtain a plurality of identifier s corresponding to the plurality of speeches based on the generated speaker embeddings being input to the at least one speech model, and obtain a speech of the user related to the first identifier and a speech of the other person related to the second identifier among the plurality of speeches.

According to various embodiments, the at least one processor (for example, the first processor 610 in FIG. 6A) may be configured to post-process the obtained speeches of the user and the other person and output the post-processed speeches of the user and the other person through the speaker (for example, the speaker 621 in FIG. 6A).

According to various embodiments, the at least one processor (for example, the first processor 610 in FIG. 6A) may be configured to further identify a third ID of a speaker selected by the user, further obtain a third speech corresponding to the third ID in the plurality of speeches, and output the speech of the user, the speech of the other person, and the third speech through the speaker (for example, the speaker 621 in FIG. 6A).

According to various embodiments, a method of operating an electronic device (for example, the electronic device 501 in FIG. 5) may include outputting audio through a speaker based on data received from an external electronic device (for example, the UE 503 in FIG. 6A) through the communication circuit (for example, the first communication circuit 622 in FIG. 6A), identifying an utterance including a specified keyword received through at least one of the plurality of microphones (for example, the microphones 620a and 620b in FIG. 16), and decreasing the volume of the audio output through the speaker (for example, the speaker 621 in FIG. 6A) based on identifying the utterance including the specified keyword, and performing an operation for providing a speech of a user of the electronic device (for example, the electronic device 501 in FIG. 5) and a speech of a person other than the user of the electronic device (for example, the electronic device 501 in FIG. 5) based on at least part of ambient sounds received through at least one of the plurality of microphones (for example, the microphones 620a and 620b in FIG. 16).

According to various embodiments, the method may include storing a plurality of keywords from the external electronic device (for example, the UE 503 in FIG. 6A) or sounds corresponding to the plurality of keywords in a memory (for example, the first memory in FIG. 6A) of the electronic device (for example, the electronic device 501 in FIG. 5), receiving the utterance through the microphone during the output of the audio, and identifying whether the utterance includes the specified keyword based on the received utterance and at least one of the plurality of keywords or the sounds corresponding to the plurality of keywords.

According to various embodiments, the plurality of keywords may include at least one first keyword and at least one second keyword. The at least one first keyword may be a name of the user, and the at least one second keyword may be generated based on the at least one first keyword.

According to various embodiments, the method may include identifying whether the utterance has been spoken by the user, based on identifying the utterance including the specified keyword, decreasing the volume of the audio output through the speaker, and performing the operation for providing the speech of the user of the electronic device and the speech of the other person, based on identifying that the utterance has been spoken by the user.

According to various embodiments, the method may include identifying at least one specified value by using a sensor of the electronic device (for example, the electronic device 501 in FIG. 5) based on identifying the utterance including the specified keyword, the at least one specified value indicating that the utterance has been spoken by the user, and identifying that the utterance has been spoken by the user, based on identifying the at least one specified value.

According to various embodiments, an electronic device (for example, the electronic device 501 in FIG. 5) may include a communication circuit (for example, the first communication circuit 622 in FIG. 6A), a plurality of microphones (for example, the microphones 620a and 620b in FIG. 16), a speaker (for example, the speaker 621 in FIG. 6A), and at least one processor (for example, the first processor 610 in FIG. 6A). The at least one processor (for example, the first processor 610 in FIG. 6A) may be configured to output audio through the speaker (for example, the speaker 621 in FIG. 6A) based on data received through the communication circuit (for example, the first communication circuit 622 in FIG. 6A), decrease the volume of the audio output through the speaker (for example, the speaker 621 in FIG. 6A) when a first utterance of a user of the electronic device (for example, the electronic device 501 in FIG. 5) has been received through at least one of the plurality of microphones (for example, the microphones 620a and 620b in FIG. 16) for a specified first time period, and decrease the volume of the audio output through the speaker (for example, the speaker 621 in FIG. 6A) based on reception of a third utterance of the user for a second time period shorter than the first time period after the reception of the second utterance, when a second utterance including a specified keyword is received through at least one of the plurality of microphones (for example, the microphones 620a and 620b in FIG. 16).

Various embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a communication circuit;
a plurality of microphones;
at least one sensor configured to detect movement of the electronic device;
a speaker;
at least one processor; and
memory storing instructions,
wherein the instructions that, when executed by the at least one processor individually or collectively, cause the electronic device to:
output audio through the speaker based on data received from an external electronic device through the communication circuit;
identify an utterance including a specified keyword received through at least one of the plurality of microphones;
identify whether a user of the electronic device has turned their head based on a pattern of values received by the at least one sensor; and
based on identifying the utterance including the specified keyword and the user turning their head, decrease a volume of the output audio through the speaker and perform an operation for providing a speech of the user of the electronic device and a speech of a conversant with the user of the electronic device based on at least some of ambient sounds received through at least some of the plurality of microphones, from the user's preset mouth direction, forward direction, and a direction corresponding to an angle at which the head is turned,
wherein providing the speech of the user and the speech of the conversant with the user further comprises generating a new speech model by learning with a speaker embedding for the user, a speaker embedding for the conversant with the user, and at least one other speaker embedding for at least one other speaker contemporaneously speaking, the new speech model providing unique identifications for the conversant with the user, and each of the at least one other speaker.

2. The electronic device of claim 1,
wherein the instructions, when executed by the at least one processor individually or collectively, cause the electronic device to:
store a plurality of keywords from the external electronic device or sounds corresponding to the plurality of keywords in the memory;
receive the utterance through the at least one of the plurality of microphones during outputting of the audio; and
identify whether the utterance includes the specified keyword based on the received utterance and at least one of the plurality of keywords or the sounds corresponding to the plurality of keywords.

3. The electronic device of claim 2, wherein the plurality of keywords includes at least one first keyword and at least one second keyword, and
wherein the at least one first keyword is a name of the user, and the at least one second keyword is generated based on the at least one first keyword.

4. The electronic device of claim 1, wherein the instructions, when executed by the at least one processor individually or collectively, cause the electronic device to:
identify whether the utterance has been spoken by the user, based on identifying the utterance including the specified keyword, and
based on identifying that the utterance has been spoken by the user, decrease the volume of the audio output through the speaker and perform the operation for providing the speech of the user of the electronic device and the speech of the conversant with the user.

5. The electronic device of claim 4, further comprising a sensor,
wherein the instructions, when executed by the at least one processor individually or collectively, cause the electronic device to:
identify at least one specified value by using the sensor based on identifying the utterance including the specified keyword, the at least one specified value indicating that the utterance has been spoken by the user; and
identify that the utterance has been spoken by the user, based on identifying the at least one specified value.

6. The electronic device of claim 4, wherein the instructions, when executed by the at least one processor individually or collectively, cause the electronic device to:
generate first feature information about at least one speech of the user, before identifying the utterance including the specified keyword;
compare feature information about the utterance received through at least one of the plurality of microphones with the first feature information, based on identifying the utterance including the specified keyword; and
identify that the utterance has been spoken by the user based on a result of the comparison.

7. The electronic device of claim 1, wherein the instructions, when executed by the at least one processor individually or collectively, cause the electronic device to:
receive the speech of the conversant with the user through at least one of the plurality of microphones, based on identifying the utterance including the specified keyword;
when the speech of the conversant with the user has been received for a specified time period, generate a speaker embedding for the conversant with the user based on the speech of the conversant with the user received for the specified time period; and
obtain the speech of the user and the speech of the conversant with the user based on an obtained at least one speech model, and output the speech of the user and the speech of the conversant with the user.

8. The electronic device of claim 7,
wherein the instructions, when executed by the at least one processor individually or collectively, cause the electronic device to:
compare at least one speaker embedding for at least one person pre-stored in the memory with the speaker embedding for the conversant with the user; and
when the conversant with the user is identified as different from the at least one person based on a result of the comparison, obtain the at least one speech model.

9. The electronic device of claim 8, wherein the instructions, when executed by the at least one processor individually or collectively, cause the electronic device to generate the at least one speech model by performing training by using the speaker embedding for the user and the speaker embedding for the conversant with the user as input data and using a first identifier corresponding to the user and a second identifier corresponding to the conversant with the user as output data, and
wherein the at least one speech model is configured to output the first identifier or the second identifier in response to input of the speaker embedding for the user or the speaker embedding for the conversant with the user.

10. The electronic device of claim 9, wherein the instructions, when executed by the at least one processor individually or collectively, cause the electronic device to:
receive the ambient sounds through at least one of the plurality of microphones after the at least one speech model is generated;
separate a plurality of speeches from the received ambient sounds, the plurality of speeches corresponding to a plurality of persons;
generate speaker embeddings for the plurality of persons based on the plurality of speeches;
obtain a plurality of identifiers corresponding to the plurality of speeches based on the generated speaker embeddings being input to the at least one speech model; and
obtain a speech of the user related to the first identifier and a speech of the conversant with the user related to the second identifier among the plurality of speeches.

11. The electronic device of claim 10, wherein the at least one processor is configured to post-process the obtained speeches of the user and the conversant with the user and output the post-processed speeches of the user and the conversant with the user through the speaker.

12. The electronic device of claim 10, wherein the instructions, when executed by the at least one processor individually or collectively, cause the electronic device to:
further identify a third identifier of a person selected by the user;
further obtain a third speech corresponding to the third identifier among the plurality of speeches; and
output the speech of the user, the speech of the conversant with the user, and the third speech through the speaker.

13. The electronic device of claim 1, wherein the instructions, when executed by the at least one processor individually or collectively, cause the electronic device to:
based on identifying the utterance including the specified keyword, stop output of anti-noise generated by an active noise cancellation circuit of the electronic device through the speaker.

14. A method of operating an electronic device, the method comprising:
outputting audio through a speaker based on data received from an external electronic device through a communication circuit of the electronic device;
identifying an utterance including a specified keyword received through at least some of a plurality of microphones of the electronic device;
identifying whether a user of the electronic device has turned their head based on a pattern of values received by at least one sensor; and
based on identifying the utterance including the specified keyword and the user turning their head, decreasing volume of the audio output through the speaker and performing an operation for providing a speech of the user of the electronic device and a speech of a conversant with the user of the electronic device based on at least some of ambient sounds received through at least one of the plurality of microphones, from the user's preset mouth direction, forward direction, and a direction corresponding to an angle at which the head is turned,
wherein providing the speech of the user and the speech of the conversant with the user further comprises generating a new speech model by learning with a speaker embedding for the user, a speaker embedding for the conversant with the user, and at least one other speaker embedding for at least one other speaker contemporaneously speaking, the new speech model providing unique identifications for the conversant with the user, and each of the at least one other speaker.

15. The method of claim 14, further comprising:
storing a plurality of keywords from the external electronic device or sounds corresponding to the plurality of keywords in a memory of the electronic device;
receiving the utterance through the at least one of the plurality of microphones during outputting of the audio; and
identifying whether the utterance includes the specified keyword based on the received utterance and at least one of the plurality of keywords or the sounds corresponding to the plurality of keywords.

16. The method of claim 15, wherein the plurality of keywords include at least one first keyword and at least one second keyword, and
   wherein the at least one first keyword is a name of the user, and the at least one second keyword is generated based on the at least one first keyword.

17. The method of claim 14, further comprising:
identifying whether the utterance has been spoken by the user, based on identifying the utterance including the specified keyword; and
based on identifying that the utterance has been spoken by the user, decreasing the volume of the audio output through the speaker and perform the operation for providing the speech of the user of the electronic device and the speech of the conversant with the user.

18. The method of claim 17, further comprising:
identifying at least one specified value by using a sensor of the electronic device based on identifying the utterance including the specified keyword, the at least one specified value indicating that the utterance has been spoken by the user; and
identifying that the utterance has been spoken by the user, based on identifying the at least one specified value.

19. A non-transitory computer-readable storage medium storing computer-executable instructions that, when executed by at least one processor of an electronic device, cause the electronic device to perform operations, the operations comprising:

outputting audio through a speaker based on data received from an external electronic device through a communication circuit of the electronic device;
identifying an utterance including a specified keyword received through at least some of a plurality of microphones of the electronic device;
identifying whether a user of the electronic device has turned their head based on a pattern of values received by at least one sensor; and
based on identifying the utterance including the specified keyword and the user turning their head, decreasing volume of the audio output through the speaker and performing an operation for providing a speech of the user of the electronic device and a speech of a conversant with the user of the electronic device based on at least some of ambient sounds received through at least one of the plurality of microphones, from the user's preset mouth direction, forward direction, and a direction corresponding to an angle at which the head is turned,
wherein providing the speech of the user and the speech of the conversant with the user further comprises generating a new speech model by learning with a speaker embedding for the user, a speaker embedding for the conversant with the user, and at least one other speaker embedding for at least one other speaker contemporaneously speaking, the new speech model providing unique identifications for the conversant with the user, and each of the at least one other speaker.

\* \* \* \* \*